Nov. 29, 1966  M. H. TRYGAR  3,288,978
METHOD AND DEVICE FOR POSITIONING AND WELDING
Filed Oct. 17, 1963  17 Sheets-Sheet 5

MICHAEL HENRY TRYGAR
INVENTOR.

BY John R. Faulkner
Olin B. Johnson
ATTORNEYS

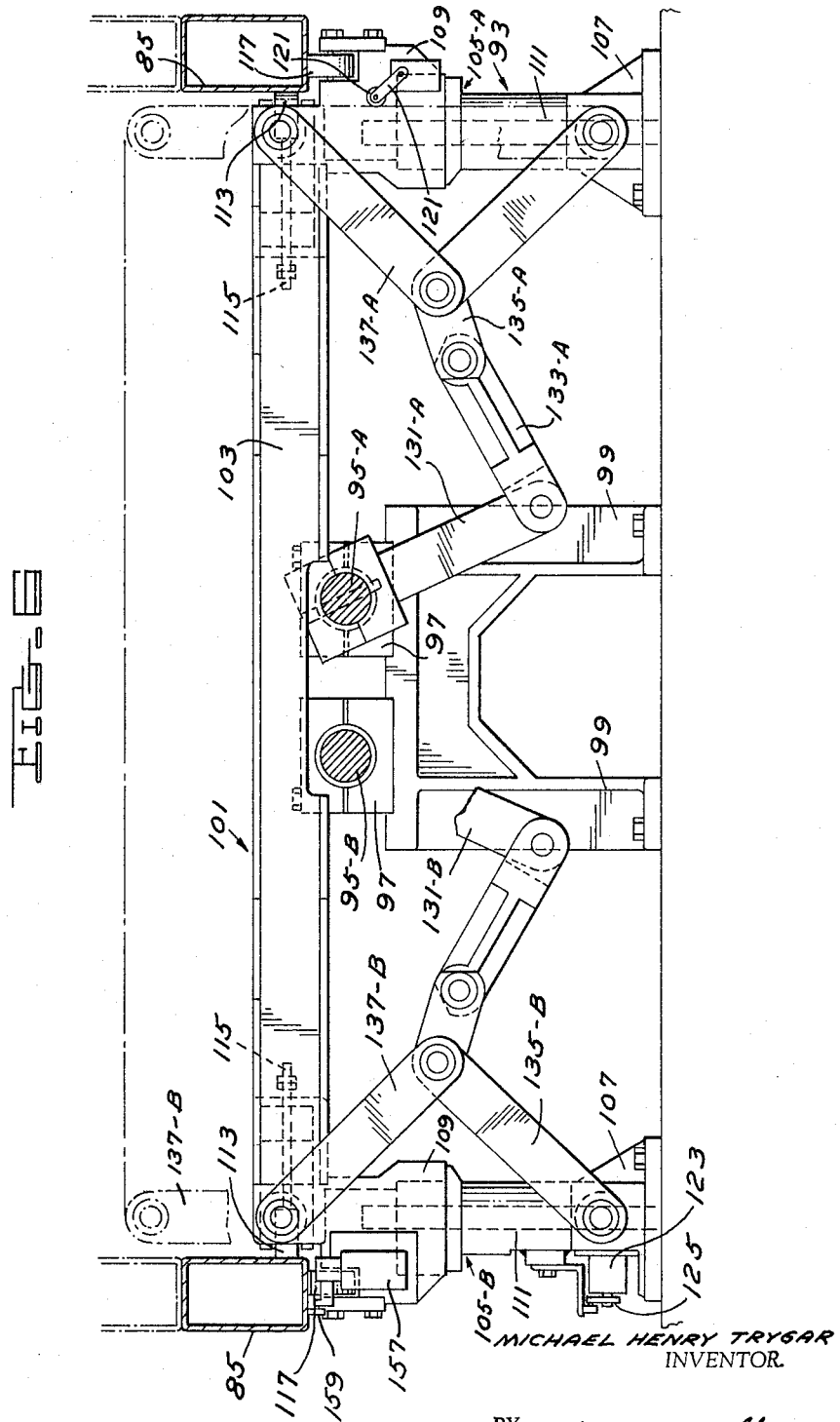

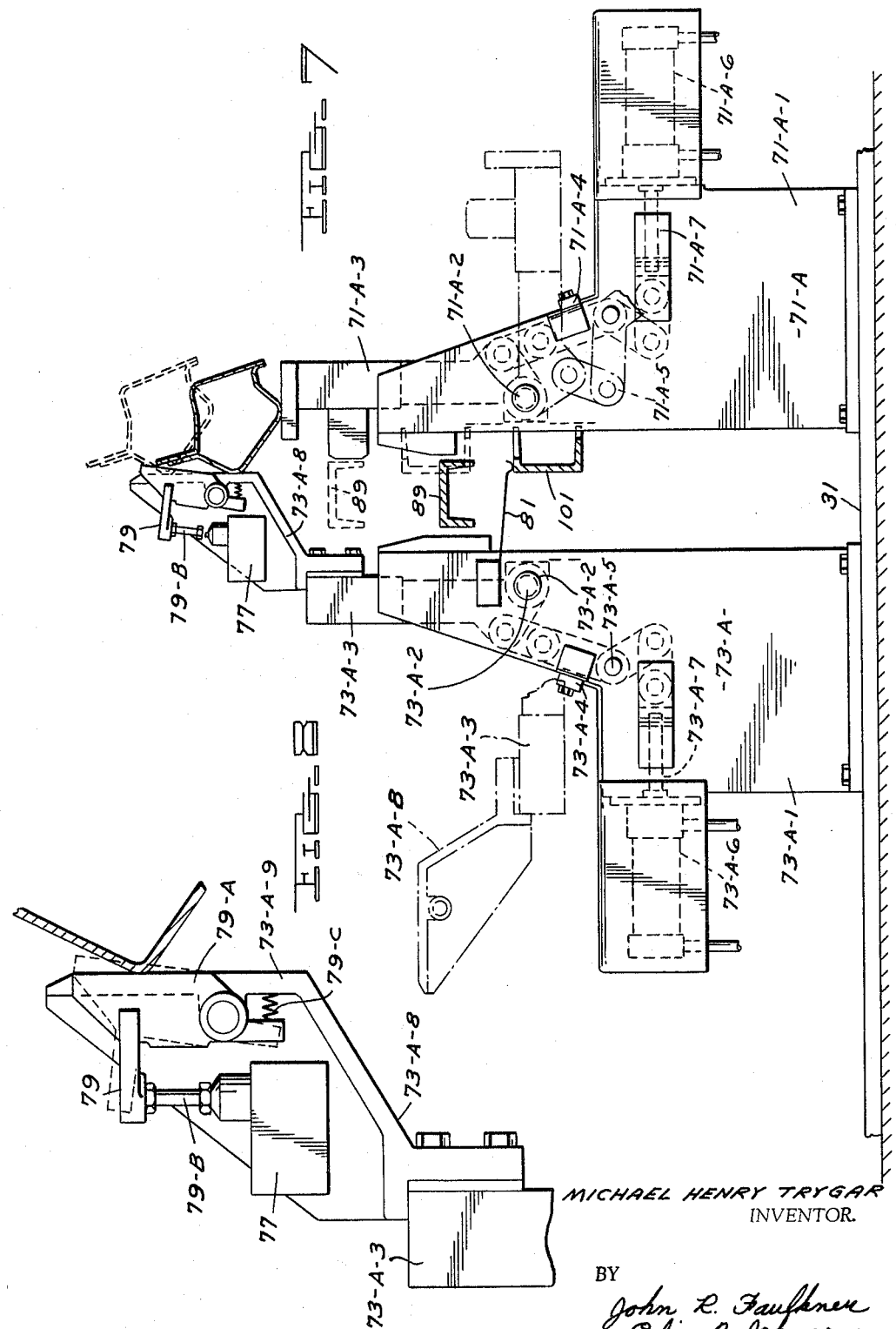

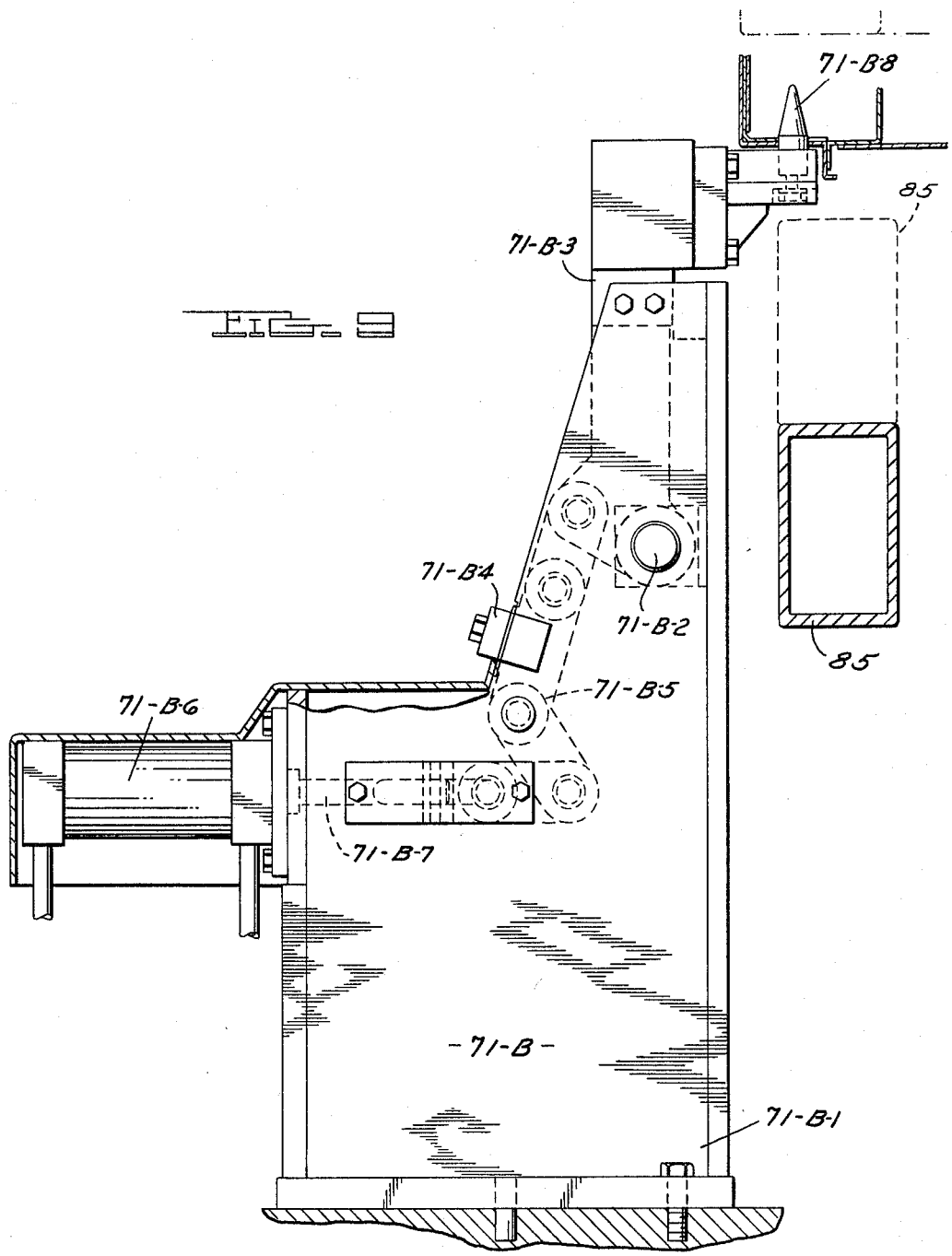

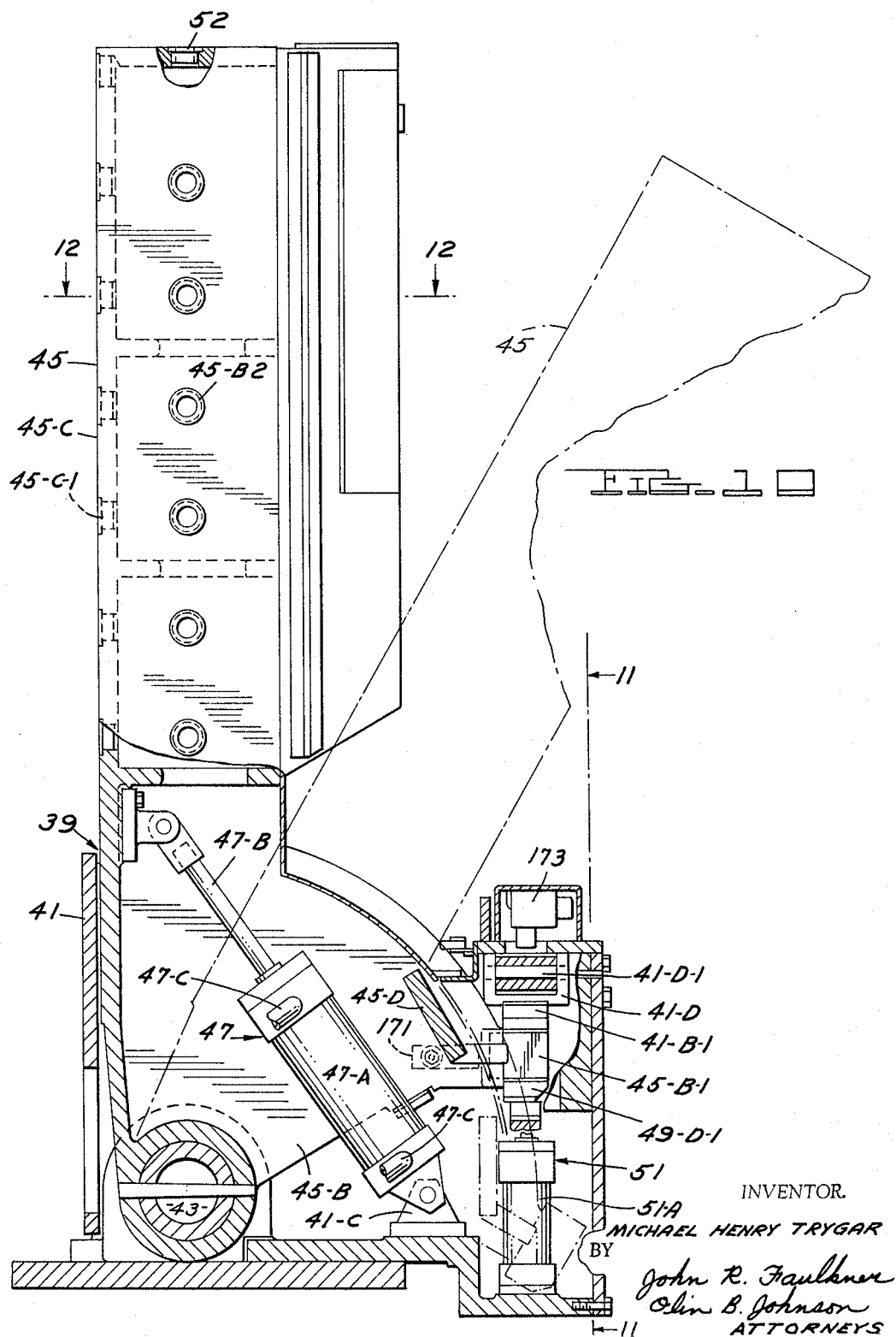

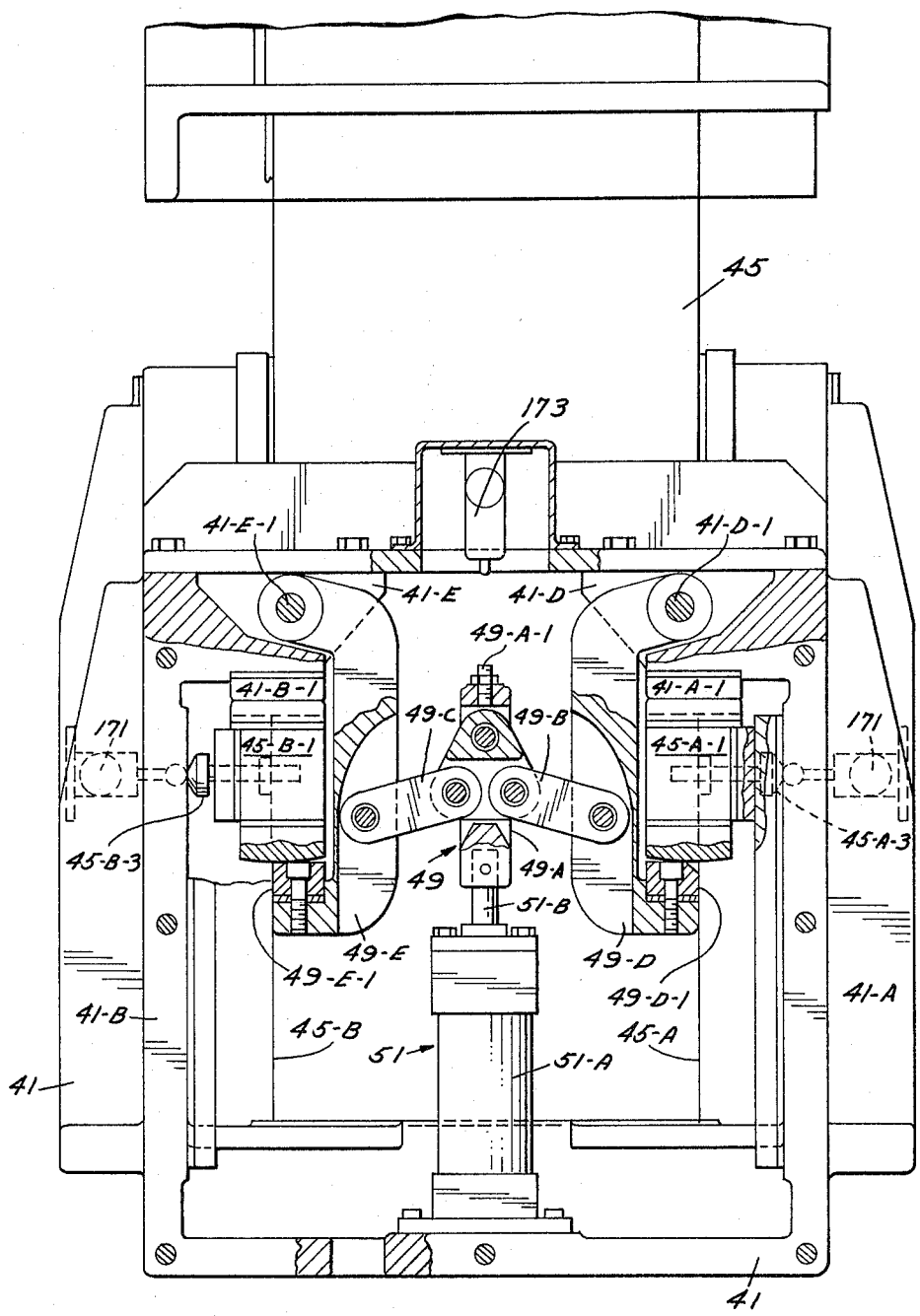
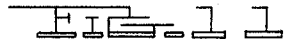

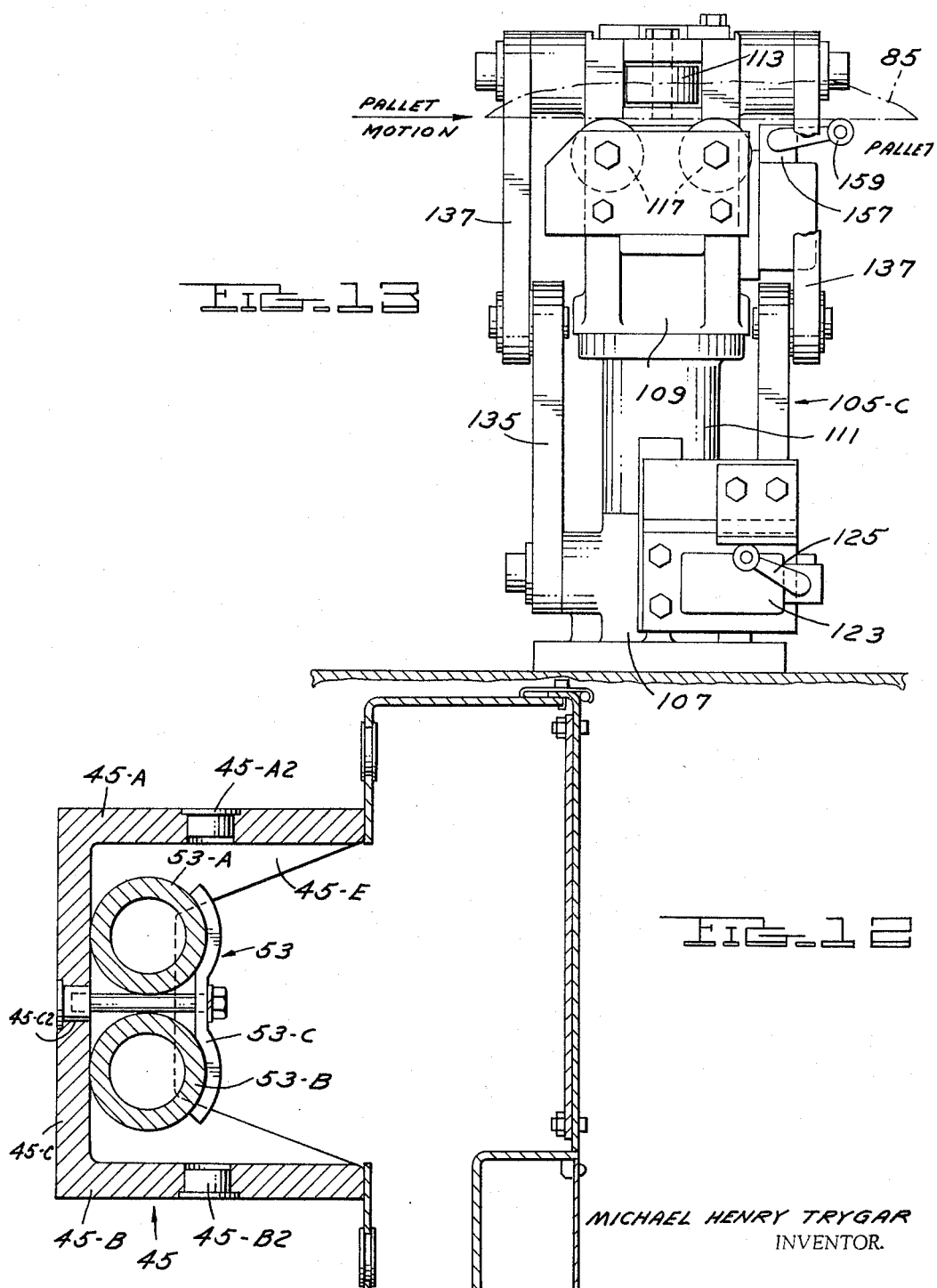

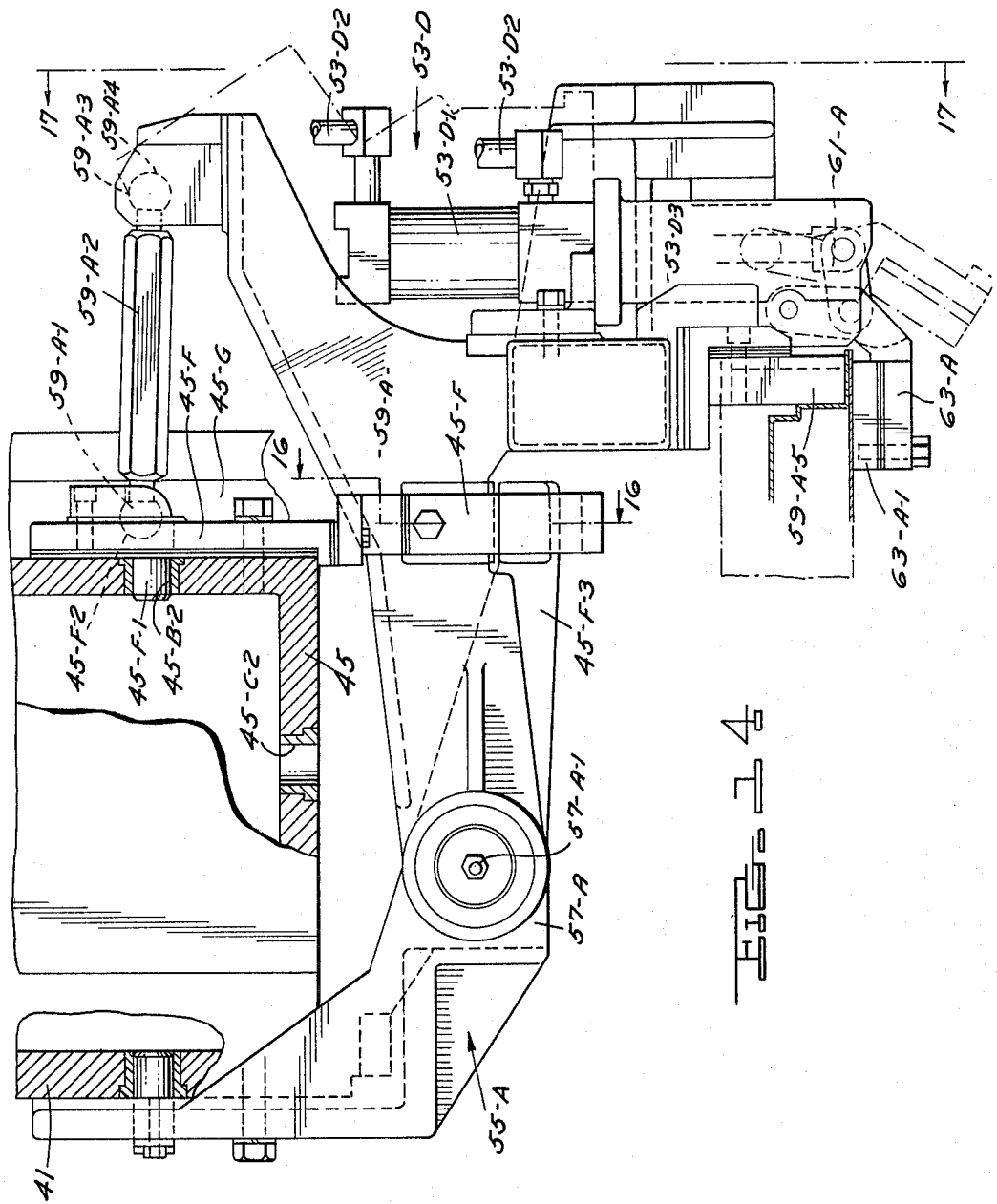

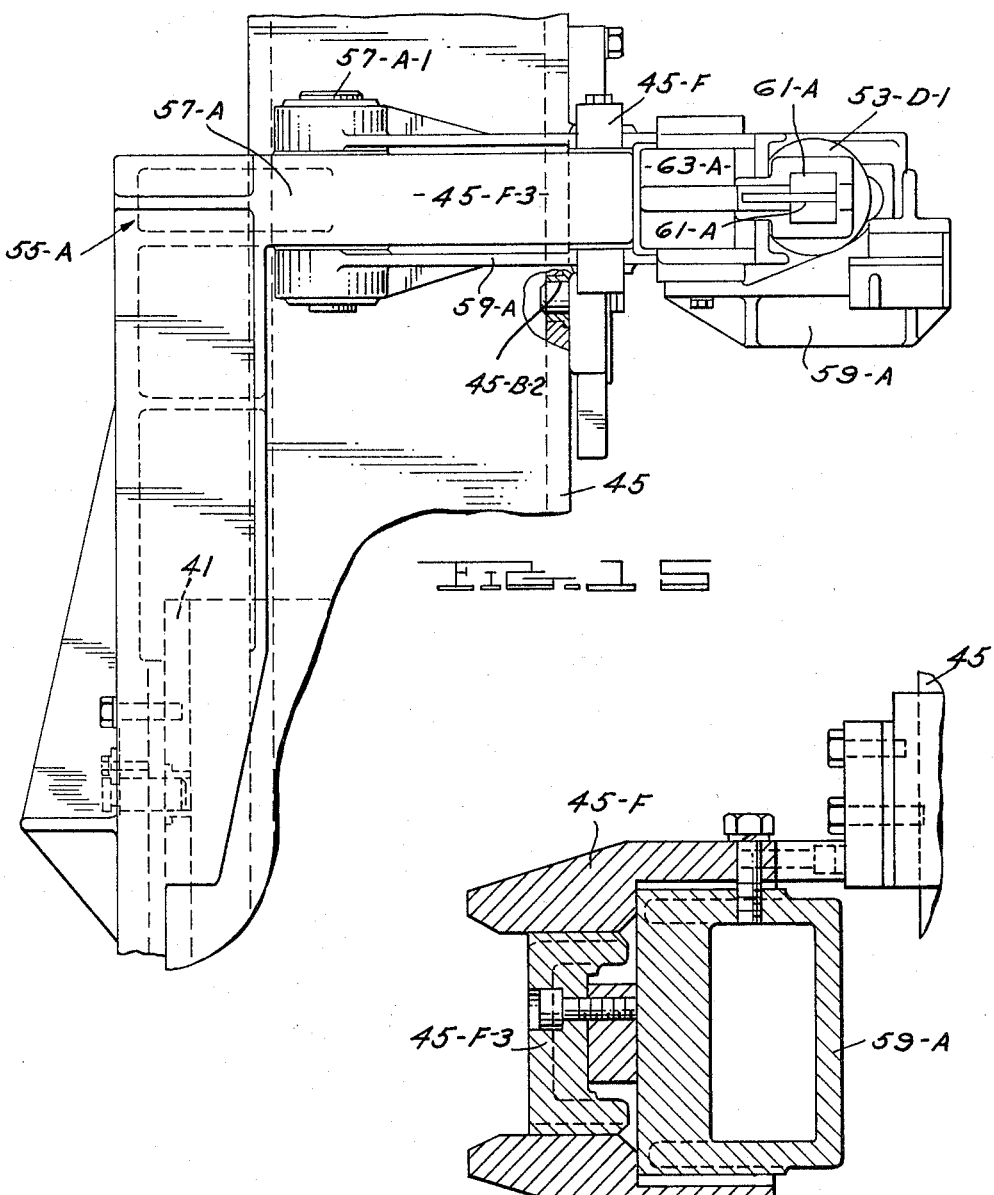

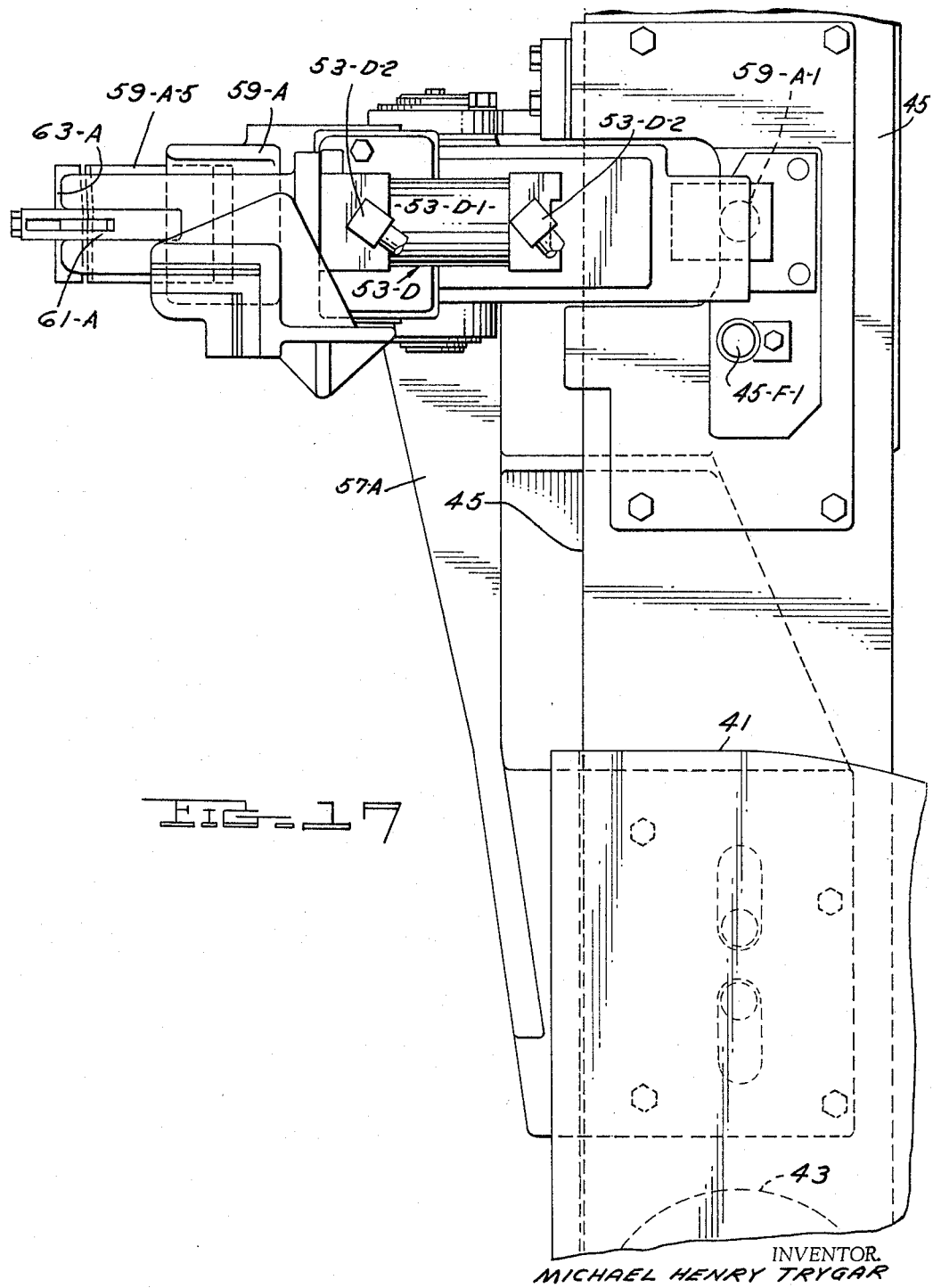

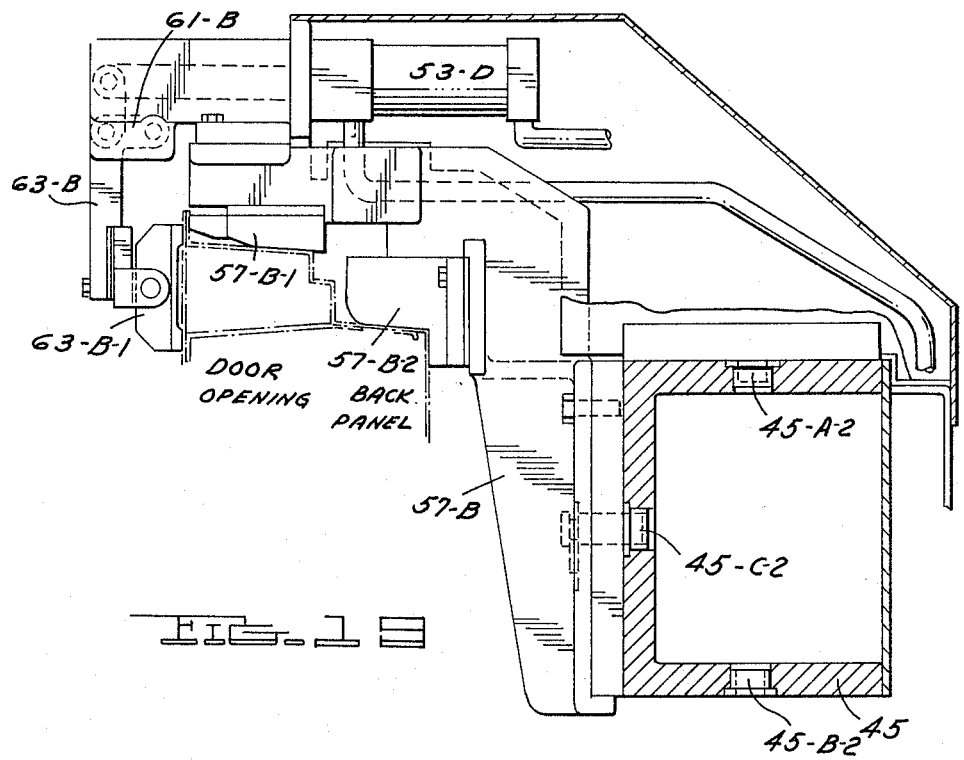
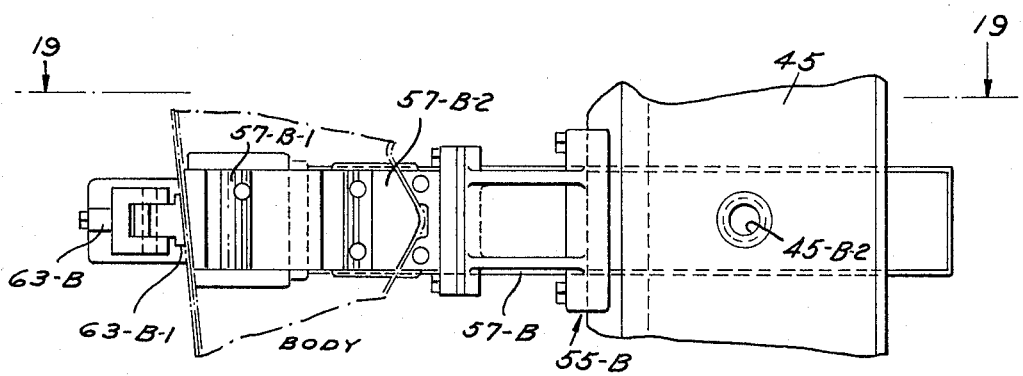

MICHAEL HENRY TRYGAR
INVENTOR.

BY John R. Faulkner
Olin B. Johnson
ATTORNEYS the appended claims,
companying drawings for an
of the invention, wherein:

United States Patent Office 3,288,978
Patented Nov. 29, 1966

3,288,978
METHOD AND DEVICE FOR POSITIONING AND WELDING
Michael Henry Trygar, Southfield, Mich., assignor to The Ford Motor Company, Dearborn, Mich., a corporation of Delaware
Filed Oct. 17, 1963, Ser. No. 316,890
52 Claims. (Cl. 219—80)

This invention relates to improvements in the method and means for manufacturing frame or shell-like objects such as automobile bodies. In particular, this invention relates to a novel work holding device and is especially concerned with embodiments thereof which are adapted to hold an automobile body in fixed position to facilitate work thereon. More particularly, this invention relates to a novel device for gripping and holding the several preformed parts of a tenuously assembled automobile body in proper position and relation for welding and to the use of such device in combination with automatic welding means to assure weld uniformity and to provide bodies of greater strength and dimensional integrity.

The various devices heretofore employed for holding together the several parts or sections of automobile bodies for welding have in the main employed a plurality of individually and manually actuated clamping means or have been constructed and arranged for forming subassemblies for subsequent combination. The use of pivotable standards in devices for assembling automobile bodies has been disclosed by J. Ledwinka in U.S. Patents 1,415,588 and 1,441,436. These assembly devices comprise a frame-like structure into which the several parts of an automobile body are brought together and secured. The structure includes standards, one pair of which is pivotable to allow removal of the body formed within the structure. The delays inherent in the operation of all such devices limit their output while the absence of effective controls for regulating the order and degree of clamp closure hold down the percentage of effective spot welds.

It is therefore one object of this invention to provide an improved method and means for holding automobile bodies in assembled relationship for work thereon whereby multiple welding may be carried out upon the body assembly with assurance of uniformly effective welds without distortion of the unitized product.

It is another object of this invention to provide an improved locating and holding device for use in the welding together of tenuously assembled parts of an automobile body wherein the motion of the body assembly entering the holding device actuates body locating means for accurately positioning the body prior to clamping.

It is another object of this invention to provide an improved method and means for welding together tenuously assembled parts of an automobile body wherein the body assembly is sequentially clamped in predetermined order by multiple clamping means supported by opposing rows of pivotable pillars or standards.

It is another object of this invention to provide an improved method and means for welding an automobile body assembly wherein location of the body assembly in a predetermined position upon support means actuates sequential closing of clamping means upon such assembly.

It is still another object of this invention to provide an improved method and means for welding together parts of an automobile body assembly wherein the termination of sequential clamping of such parts by multiple clamping means actuates automatic welding means for the welding together of such parts and the termination of such welding actuates release of the assembly from such clamping means.

With the foregoing and other objects in view which will be made manifest in the following detailed description and specifically pointed out in the appended claims, reference is had to the accompanying drawings for an illustrative embodiment of the invention, wherein:

Figure 1:
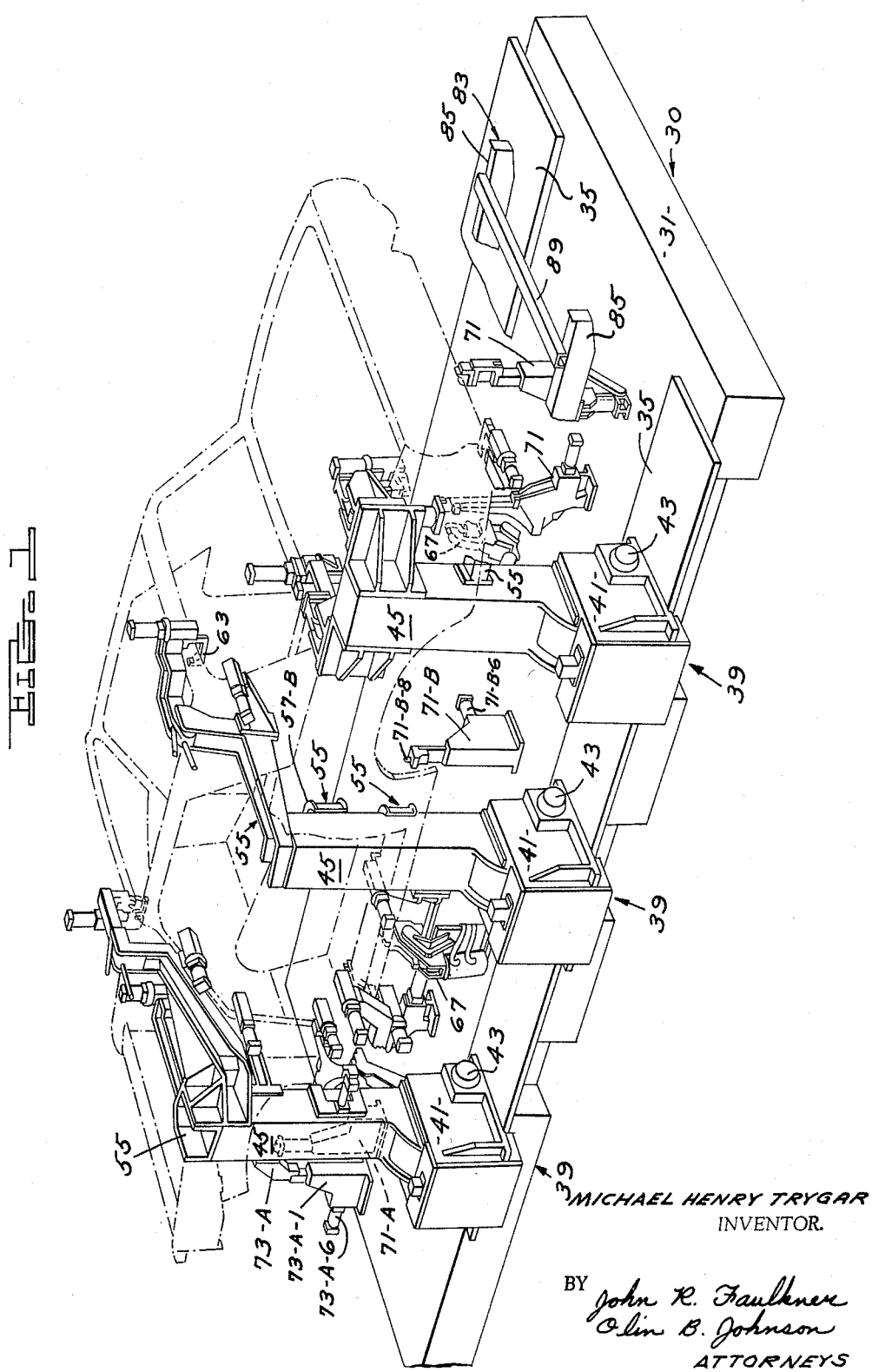
FIGURE 1 is a perspective partial assembly view of the body framing or holding device of this invention in closed position upon an automobile body shown in broken outline.
Figure 2:
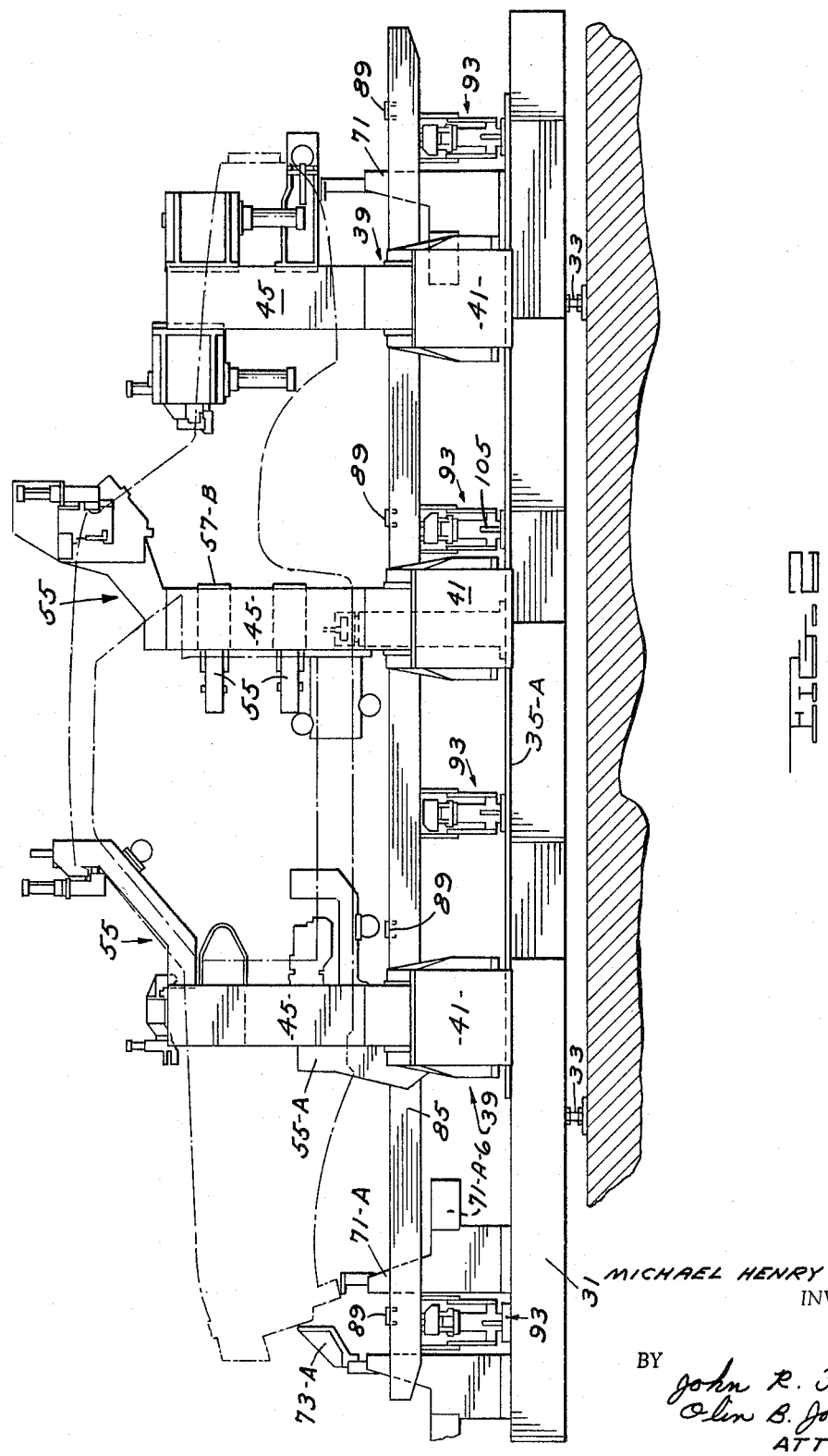
FIGURE 2 is a side elevational view of the device of FIGURE 1.
Figure 3:
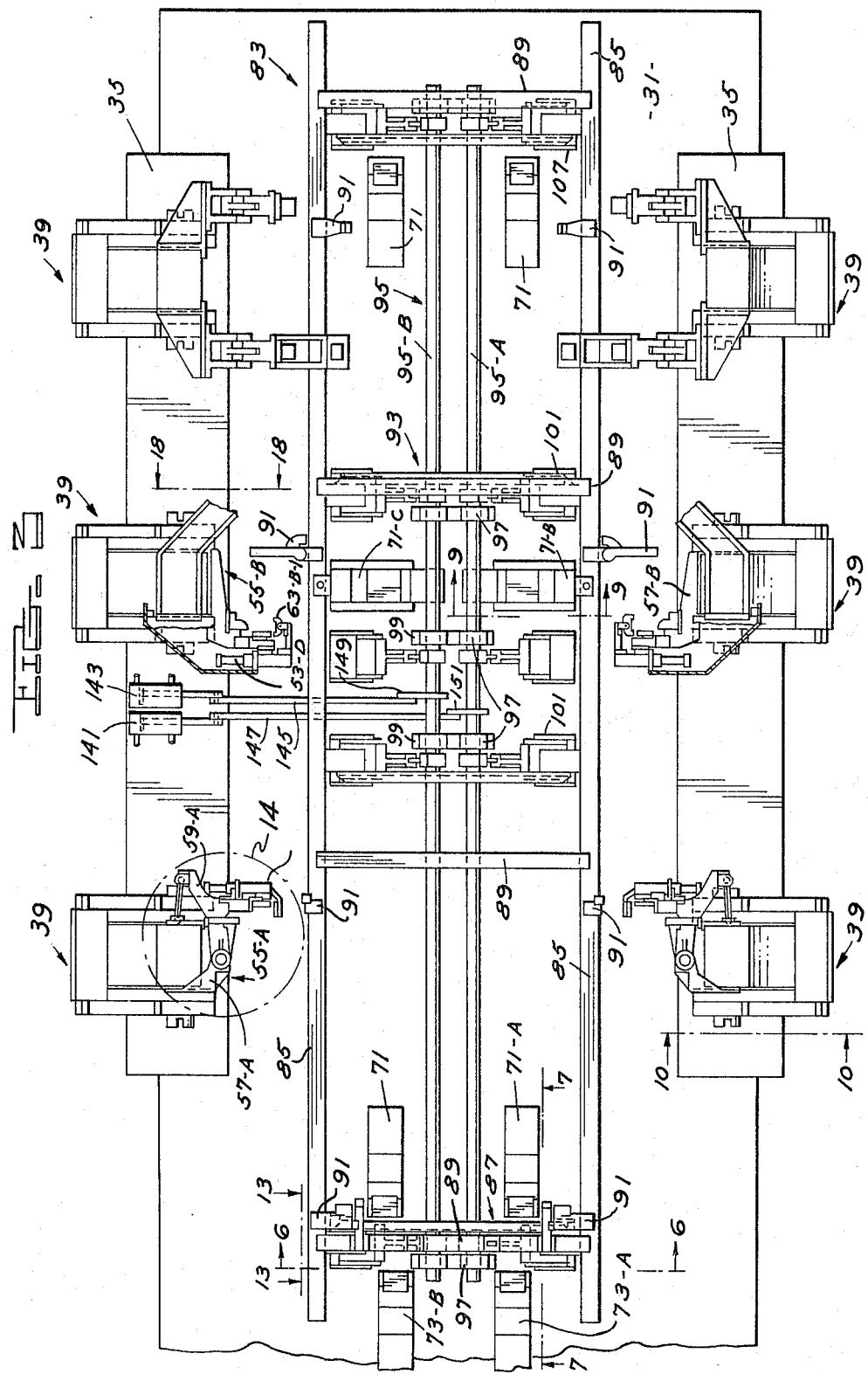
FIGURE 3 is a plan view of the device of FIGURE 1.
Figure 4:
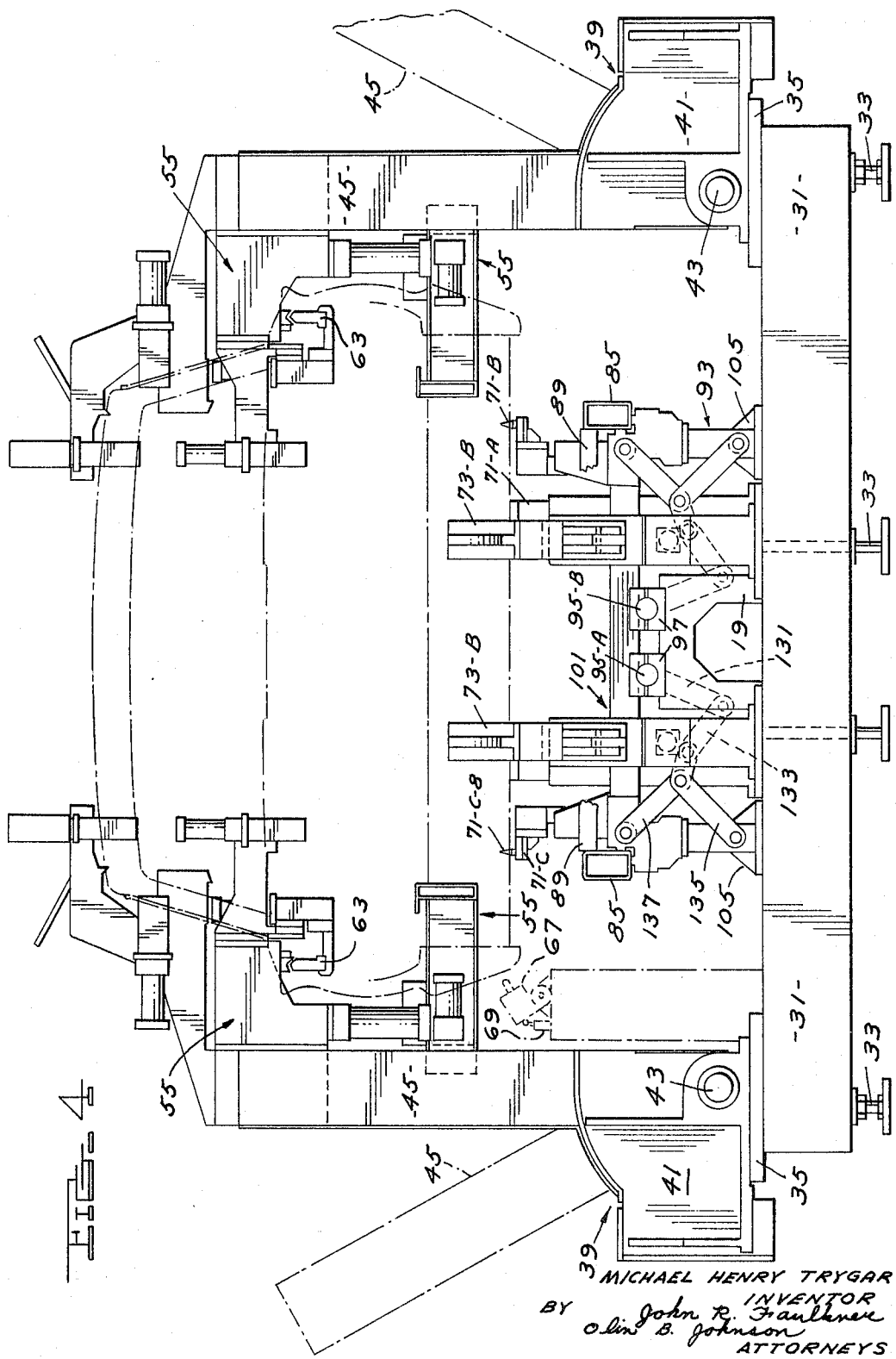
FIGURE 4 is a rear elevational view of the device of FIGURE 1 which also illustrates in broken outline the pivoting pillars of the device in open position and one of a plurality of automatic welding machines which may be employed with the device.
Figure 5:
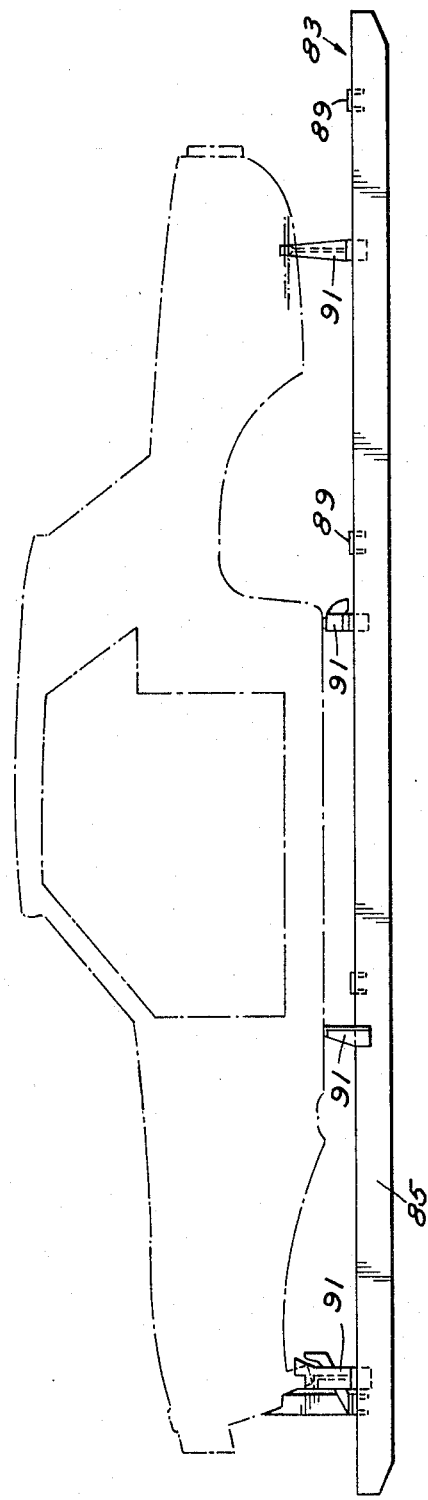
FIGURE 5 is a view in side elevation of a body supporting pallet or skid upon which an automobile body shown in broken outline is carried as it enters and leaves the holding device shown in the previous figures.

FIGURE 6 is a sectional view of the vertically reciprocal lift or elevator of the framing device in depressed or down position taken along line 6—6 of FIGURE 3 and a fragmentary sectional view of the pallet in down position with the pallet and lift shown in broken outline in their raised or up positions, such raised position of the pallet being that position assumed by the pallet on entering and leaving the holding device;

FIGURE 7 is a side view of frontal mechanisms of the holding device taken along line 7—7 of FIGURE 3 showing a support unit having a pivotable arm for providing vertical support for the front portion of an automobile body or other workpiece when such arm is in an upright position, a pivotable frontal stop mechanism constructed and arranged to arrest the forward movement of a workpiece entering the device and to pivot out of the path of a processed workpiece leaving the device, and actuating means for initiating a series of sequential movements for moving the workpiece into processing position upon such device;

FIGURE 8 is a fragmentary side elevational view of the stop mechanism of FIGURE 7 illustrating the relative position of the stop mechanism, the workpiece and the actuating means supported by the stop mechanism when the forward movement of the workpiece is terminated prior to processing.

Figure 20:
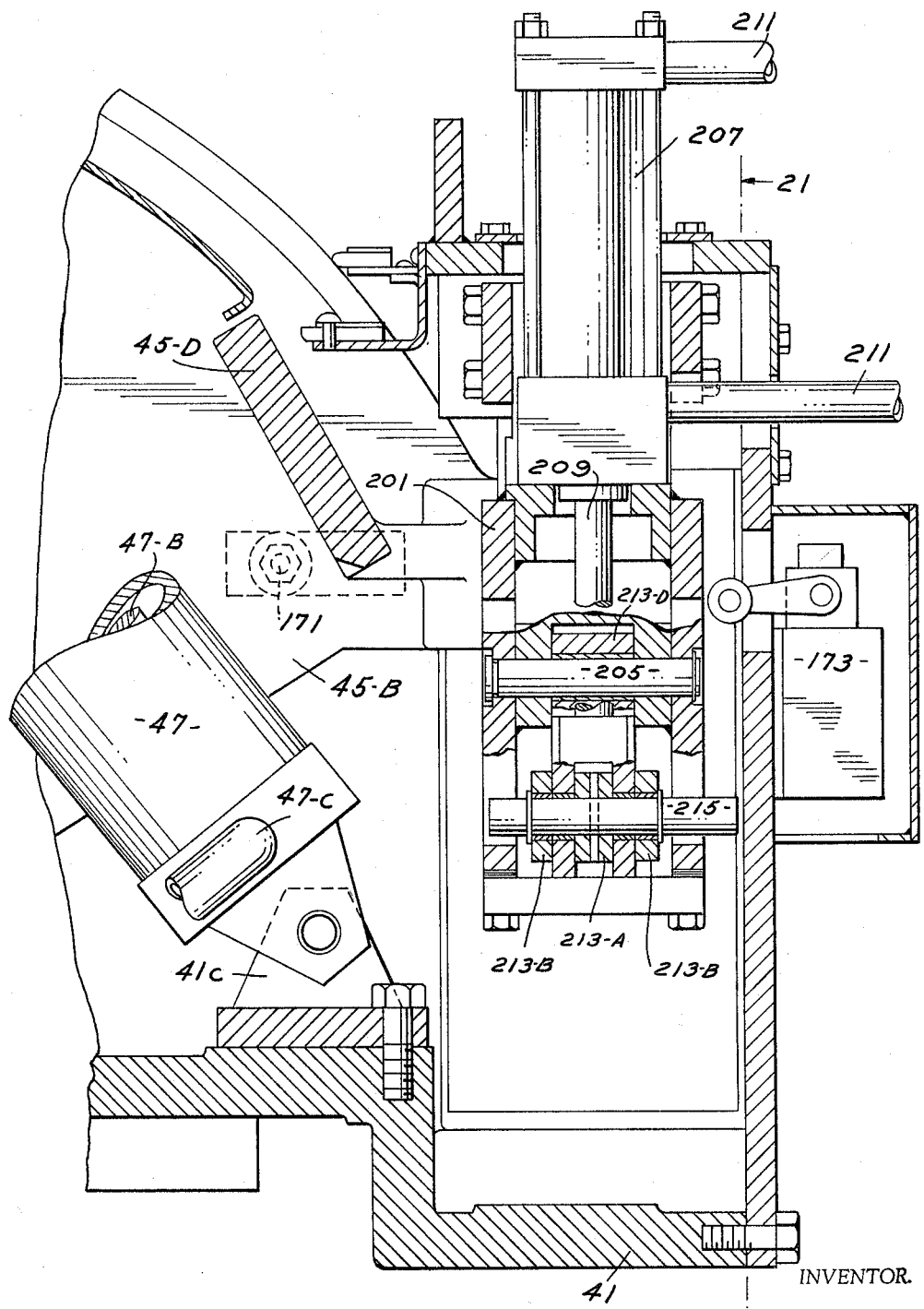
Figure 21:
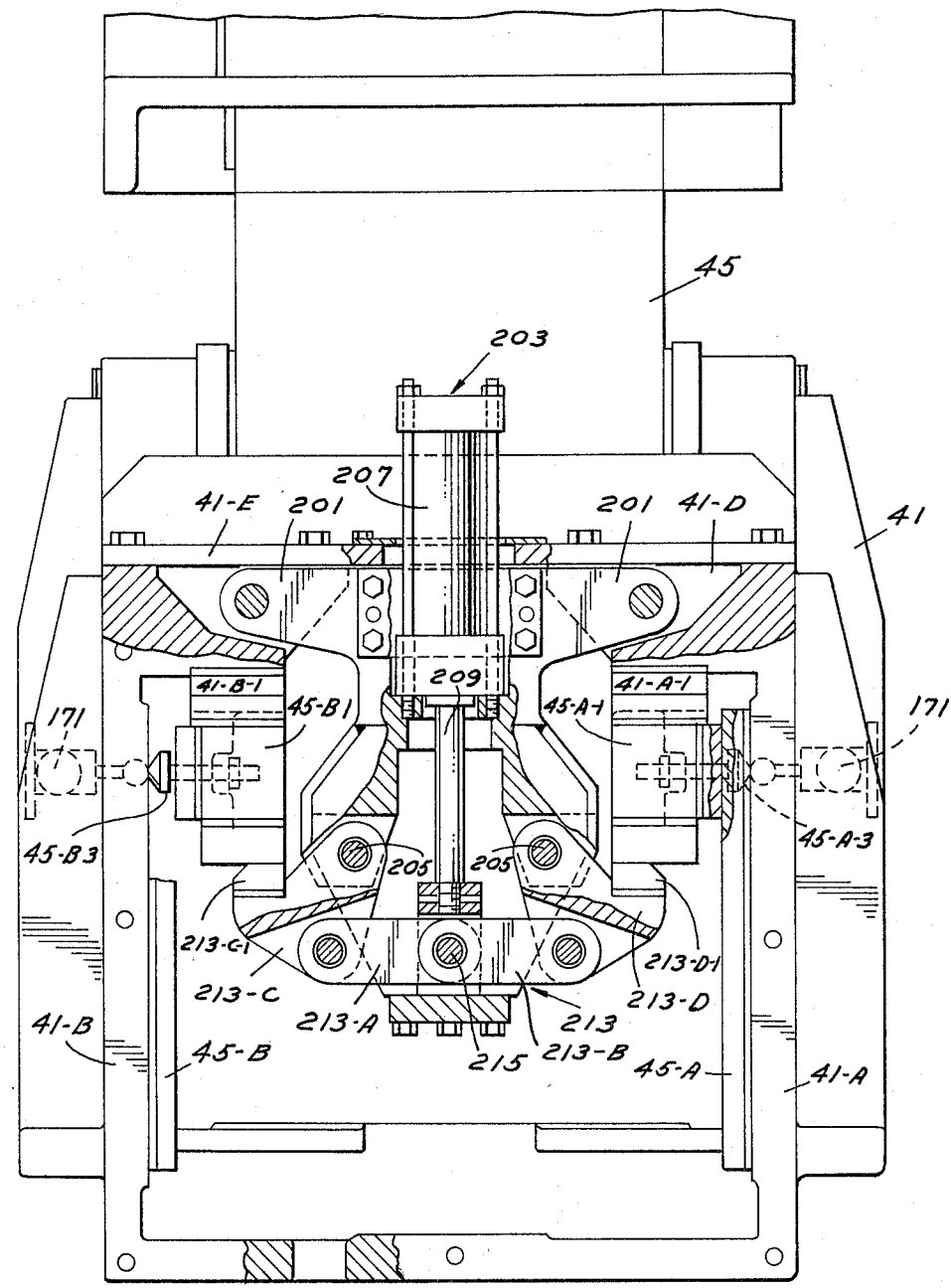

FIGURE 9 is a view taken along line 9—9 of FIGURE 8 showing in partial section a support unit including a vertically extending, substantially conical locating means at one end of a pivotable arm for more accurate positioning of the workpiece within the holding and framing device prior to clamping and a fragmentary view of the pallet upon which the workpiece enters and leaves the device illustrating the positioning of the pallet in relation to the workpiece after disengagement therefrom;

FIGURE 10 is a partially sectional view of one of the pivoting pillars of the framing device taken along line 10—10 of FIGURE 3;

FIGURE 11 is a sectional end view of the pillar of FIGURE 10 taken substantially along line 11—11 illustrating means for locking the pillar in upright position;

FIGURE 12 is a sectional view of the pillar of FIGURE 10 taken along line 12—12 illustrating a plurality of locating means whereby clamping means for gripping the workpiece during processing may be connected with the pillar at any of a plurality of locations;

FIGURE 13 is a side elevational view taken along line 13—13 of FIGURE 3 showing the front lift assembly of the elevator;

FIGURE 14 is a plan view of the delayed action type clamping means indicated within encircled area 14 of FIGURE 3;

FIGURE 15 is a side view of the clamping means shown in FIGURE 14;

FIGURE 16 is a sectional view taken along line 16—16 of FIGURE 14 and illustrating intermediate support means for the pivotable arms of clamping means of FIGURE 14;

FIGURE 17 is a side view of the clamping means of FIGURE 14;

FIGURE 18 is a view along line 18—18 of FIGURE 3 providing a side view of another embodiment of pillar supporting clamping means through which the holding device grips a workpiece during processing;

FIGURE 19 is a plan view of the clamping means of FIGURE 18 with the connecting portion of its associated pillar and the protective cover of the clamping means shown in section;

FIGURE 20 is a fragmentary side view of another embodiment of the pillar and pillar locking means, such embodiment constituting an alternative to the embodiment shown in FIGURE 10; and FIGURE 21 is a sectional view taken substantially along line 21—21 of FIGURE 20.

Referring now particularly to FIGURES 1-6 inclusive, the illustrated embodiment of the holding device 30 includes a substantially rectangular base or platform 31 which is supported by a plurality of adjustable leveling means 33. Platform 31 is turn supports the other elements, components, subassemblies, etc., hereinafter identified. Extending longitudinally of base 31 and abutting opposite and major sides thereof are flanges or pillar support elements 35 which are affixed to platform 31 by bolts or other suitable means not shown. Upon elements 35 there are mounted a plurality of pillars or standards 39 each having a stationary base member 41, a pivot shaft 43 and a movable clamp supporting member 45. Each of the movable members 45 is pivotable upon a shaft 43 in a plane perpendicular to the longitudinal axis of platform 31. Each of the pivotable members 45 is thus movable between an inner or closed position wherein such member stands upright in relation to platform 31 and an outer or open position. The pillars 39 are affixed to flanges 35 and/or platform 31 by bolts or other suitable means not shown. It will be understood that in other embodiments the platform 31 and the pillar support elements 35 may be of unitary construction and that the pillars 39 may be independently supported with no direct and/or physical connection existing between a given pillar and the other pillars on the same or opposite sides of the holding zone. The construction and operation of pillars 39 are described hereinafter in detail with reference to FIGURES 10, 11, 12, 20 and 21.

Rigidly affixed to and supported by each of the pillars 39 by bolts or other suitable means are a plurality of clamping assemblies 55 certain members of which comprise an outer arm 57, an inner arm and one or more clamps 63. The clamping assemblies 55 are constructed and arranged upon their respective pillars to engage and firmly grip various portions of an automobile body positioned between the opposing rows of pivoting pillars when the latter are in upright positions. The correspondingly situated clamping assemblies positioned on opposite sides of the holding zone may be of correspondingly or essentially different design. The construction and operation of two representative clamping assemblies 55-A and 55-B are described hereinafter with reference to FIGURES 14 through 19 inclusive.

When all the clamping means are properly closed upon the portions of the workpiece they are intended to grip, such closing actuates conventional switching means, not shown, which in turn actuates the movement of a plurality of pivotable, automatic welding units 67 forward into welding position. The welding units may be located on and/or supported by the device itself, as, for instance, on platform 31 or pillars 39, or they may be independently supported, as, for instance, by overhead suspension for upper body welding. When welding is completed a conventional electrical relay mechanism, not shown, is actuated which in turn actuates the reverse movement of the welding units 67 away from the workpiece. In this embodiment the welding period is controlled by a conventional timing device actuated by contact of the welding unit with the workpiece. In this embodiment all of the welding units move in unison either toward or away from the workpiece as the case may be. In the movement away from the workpiece, one of the units trips a limit switch 69. The tripping of limit switch 69 actuates the opening of clamps 63 to initiate steps leading to exit of the workpiece.

Affixed to the upper surface of the base or platform 31 and inboard with respect to pillars 39 are a plurality of body locating and support means 71. Each of the body support means 71 is pivotable between an upright support position and a down or rest position and is secured to platform 31 by bolts or other means. Collectively, the body support means 71 are constructed and arranged to vertically position and support an automobile body while the latter is being welded. A representative member of this series 71-A is described hereinafter with reference to FIGURE 7. Another embodiment of support means 71 which also provides a degree of lateral and horizontal positioning for the workpiece is identified herein as 71-B and is described hereinafter with reference to FIGURE 9.

Positioned forward with respect to the several body support means 71 are pivotable stop means 73-A and 73-B for arresting the forward movement of a workpiece entering the work area for processing. The construction and operation of stop means 73-A and 73-B are discussed hereinafter in relation to FIGURES 7 and 8 which also illustrate the following actuating means. Stop means 73-A supports a limit switch 77 and its pivotable actuating assembly 79. Limit switch 77 upon being actuated initiates the movement of body locating and support means 71 from their down or rest position into their upright position. Stop means 73-B supports a limit switch 81 for actuating the pivoting of stop means 73-A and 73-B forward to permit exit of the workpiece and skid. The upward movement of the stop means 73-A and 73-B is hereinafter described in relation to FIGURE 13.

In the embodiment illustrated a workpiece enters the device 30 for processing resting on a skid or pallet 83. Pallet 83 comprises a pair of longitudinally extending members or runners 85, a plurality of cross members 89 and a plurality of upright members 91 for locating a workpiece thereon.

Referring now particularly to FIGURES 3, 4, 6, and 13, a vertically reciprocal transport and guide means hereinafter referred to as elevator or lift 93 is secured to platform 31 by bolts or other means. In other embodiments lift 93 is independently supported with respect to the pillar support means. Lift 93 is reciprocal between an upper position where it serves as a guide and support means for a workpiece entering or leaving holding device 30 on pallet 83 and a lower position beneath the position assumed by the workpiece upon body locating and support means 71 during processing. Hence, lift 93 provides means for vertically positioning the workpiece in that it provides means for lowering the workpiece onto the support means 71 for processing and by raising the same to exit level after the welding has been completed.

Lift 93 includes a pair of horizontally extending actuating rods 95-A and 95-B and a plurality of lift assemblies 101 transversely disposed in relation to the actuating rods. Rods 95-A and 95-B are supported by and rotate within the bearings 97 which in turn are supported by a plurality of stationary support means 99. Support means 99 are secured to platform 31 by bolts or other suitable means. Each of the support means 99 is centrally positioned in relation to the rows of clamp supporting pillars 39 and longitudinally positioned in spaced apart relationship with relation to the lift assembly 101 with which it is associated. The rods 95–A and 95–B are spaced apart and disposed on opposite sides of the longitudinal axis of platform 31.

Each of the lift assemblies 101 includes a lift bar or cross member 103 mounted upon and supported at the ends thereof by uprights or lift standards indicated generally by the numerals 105 and secured to platform 31 by bolts or other suitable means. The cross members 103 are of a length such that each of the lift standards 105 occupies an intermediate position between the longitudinal axis of platform 31 and the nearest row of pillars 39. Each of the standards 105 include a base member 107 and a sleeve-like upper support member 109 which is affixed to the lower side of cross member 103 by bolts or other suitable means. Each of the support members 109 is slidable upon the corresponding base member 107 and is constructed and arranged to telescope over the corresponding base member 107 as the movable portion of the lift assembly moves from its upper to its lower position. Inside each of the base members 107 is a guide and support shaft 111 extending upward into the upper support member 109.

Horizontally disposed roll means 113 are supported by cross members 103 which also include roller adjustment means 115. Roll means 113 serve as guide means and side supports for the runners 85 of pallet 83 as a workpiece is moved along lift 93 on vertically disposed roll means 117 which are supported by lift standards 105.

Referring now specifically to the lift assembly of FIGURE 6, a limit switch 121 is mounted on the movable portion of standard 105–A and is actuated when the movable portion of the lift assembly 101 approaches its uppermost position. The actuation of switch 121 is hereinafter explained with the description of the motion transfer mechanism used to cause lift 93 to reciprocate. The tripping of limit switch 121 actuates the downward movement of body locating and support means 71.

A limit switch 123 is mounted on the fixed portion 107 of standard 105–B which when tripped actuates the movement of pillars 39 from their open position to their upright or closed position. Switch 123 is actuated by bracket 125 mounted on the movable portion of standard 105–B when the movable portion of the lift assembly approaches its lowermost position.

As aforementioned the movable portion of the lift assembly 101 is shown in its depressed or down position in FIGURE 6 with a portion of the assembly shown in broken outline in its raised or up position. Transfer of the movable portion of the lift assembly is effected through the rotation of rods 95–A and 95–B in opposite directions with respect to each other during both the ascension and descension movements. Thus, for instance, when the movable portion of the lift assembly is being raised, rod 95–B rotates clockwise as viewed in FIGURE 6 while rod 95–A rotates counterclockwise. When the movable portion of the lift assembly is being lowered, the directions of these motions are reversed.

Rods 95–A and 95–B are connected to the cross member or lift bar 103 by a conventional, toggle type, motion transfer mechanism here indicated by operating lever arms 131–A and 131–B, links 133–A and 133–B, bell crank levers 135–A and 135–B and lift links 137–A and 137–B. Link 137–A is constructed and arranged to trip the actuating arm of limit switch 121 when the lift assembly approaches its raised position. The corresponding parts of the other lift assemblies are identified merely by the numerals 131, 133, 135 and 137.

Means for causing rods 95–A and 95–B to rotate as aforedescribed are illustrated schematically in FIGURE 3 by conventional hydraulic cylinders 141 and 143, operating arms 145 and 147 and connecting links 149 and 151. Cylinders 141 and 143 are operatively connected to conventional pumping means, not shown. Cylinders 141 and 143 are operatively interconnected via a conventional equalizing valve, not shown, to coordinate the movements of operating arms 145 and 147.

Referring now to FIGURE 13, there is shown mounted on lift standard 105–C a limit switch 157 having a spring actuated arm 159. Arm 159 is depressed by pallet runners 85 as the pallet 83 reaches the position of arm 159 in its forward movement over lift 93 and remains depressed until pallet 83 passes over arm 159 in exiting from the machine. Upon release of the pressure of pallet 83, arm 159 is spring actuated to trip limit switch 157. The tripping of limit switch 157 actuates the return of stop means 73–A and 73–B to an upright position to receive the next incoming workpiece.

The body locating and support means 71 and the functions thereof have been listed heretofore in the general recital of the major subassemblies of holding device 30. Attention is now directed to the construction and operation of the embodiments thereof which are more fully illustrated in FIGURES 7 and 9, i.e., 71–A and 71–B, respectively.

The body locating and support means 71–A and 71–B each have a stationary base member 71–A–1 and 71–B–1, respectively, which are bolted or otherwise secured to platform 31. Fixedly mounted on base members 71–A–1 and 71–B–1, respectively, are pivot pins or shafts 71–A–2 and 71–B–2. These pins in turn respectively support the movable support arms 71–A–3 and 71–B–3 which are pivotably mounted thereon. Arms 71–A–3 and 71–B–3 are pivotable between a substantially horizontal down position where they rest against stop means 71–A–4 and 71–B–4, respectively, and an upright position where they, together with the other support means 71, support the workpiece during welding.

Means adapted to cause movement of the pivotable arms of the body locating and support means between the aforementioned positions are provided for each of such support units. They are represented here by conventional, link-lever-pivot, toggle type, motion transfer mechanisms identified by 71–A–5 and 71–B–5, respectively, and conventional, hydraulically actuated power means here indicated by cylinder 71–A–6 and 71–B–6 and piston and rod assemblies 71–A–7 and 71–B–7, respectively. As the piston rod is forced further into the stationary base member against the toggle mechanism, the movable arm moves toward its upright position and vice versa. The construction and operation of such power transmission assemblies and their equivalents are well known in the art and need not be further described here. It should be understood, however, that such assemblies provide means for transmitting power from a source, not shown, and through such transmission to create a fluid pressure within the respective cylinders and against the pistons associated therewith which, when transferred to the aforementioned toggle mechanism, is sufficient to maintain the movable arms in their upright positions under the load of the workpiece. The release of such pressure upon the piston assembly 71–A–7 and 71–B–7 and the corresponding components of the other support means 71 causes the movable arms 71–A–3, etc., to move toward their respective positions of rest. This movement is terminated when such arms contact the respective means 71–A–4, 71–B–4, etc., which are mounted on the corresponding stationary base members 71–A–1, 71–B–1, etc.

Referring now specifically to body locating and support means 71–B, there is mounted on the top of movable arm 71–B–3 a substantially conical positioning element 71–B–8 constructed and arranged to enter into an aperture provided in the under surface of the particular auto body for which this specific embodiment was designed. The unit 71–B is duplicated by unit 71–C shown in FIGURE 4 with its conical element 71–C–8 positioned to enter into a corresponding aperture in the corresponding portion of the opposite side of automobile body. The tapered surfaces of such positioning elements in cooperation with the other cooperative positioning elements hereinbefore and hereinafter described provide an exactitude of workpiece positioning which permits the automatic clamping hereinafter explained to be carried out with consistency. It will be understood that this invention is not limited to positioning elements of this configuration or to the use of any particular automobile body adapted to receive such elements. Many modifications of this positioning means can be made by one ordinarily skilled in the art, and, along with such changes, corresponding modifications can be made in the design for the bodies to be processed in the device.

In FIGURE 9 there is shown a small cutaway portion of that part of the automobile body which is adapted to receive the conical positioning element 71–B–8. This body is shown in seated position with element 71–B–8 extending through the aperture therein. Also shown in this figure is a runner 85 of pallet 83 to illustrate the position of the skid in relation to each of the support means 71 after the body has been released from the pallet and the pallet has followed the elevator means to its lowermost position. The uppermost position of runner 85 is shown in broken outline.

Referring now to FIGURES 7 and 8, the basic construction and operation of the pivotable stop means 73–A and 73–B may be considered to be identical if the limit switches mounted thereon and the mountings therefor are regarded as separate units. The pivotable stop means 73–A has a stationary base member 73–A–1 bolted to platform 31, a pivot pin or shaft 73–A–2, an arm 73–A–3 pivotable about pin 73–A–2, a stationary stop means 73–A–4, a toggle type, motion transfer mechanism 73–A–5, and a hydraulically actuated, power transfer means here indicated by cylinder 73–A–6 and a piston and rod assembly 73–A–7. The construction of each of the foregoing components of the stop means 73–A, with the exception of arm 73–A–3, are in this embodiment identical with the corresponding components of body locating and support means 71–A and function in the same manner. The arm 73–A–3 pivots on its support pin in the same manner as the movable arm 71–A–3. The opposite end of arm 73–A–3 has mounted thereon a bracket 73–A–8 which has a face 73–A–9 which arrests the forward movement of a workpiece entering the device as hereinbefore and hereinafter described. Pivotable through face 73–A–9 and mounted on bracket 73–A–8 is the aforementioned actuating assembly 79 for actuating limit switch 77. Limit switch 77 is in this embodiment mounted on bracket 73–A–8. The actuating assembly 79 comprises a pivotable bar 79–A, a substantially L-shaped bracket 79–B and a spring 79C. Spring 79–C holds the assembly in open position when at rest. Such position is indicated in solid outline in FIGURE 7 and in broken outline in FIGURE 8. When the bar 79–A is contacted by an incoming workpiece as shown in FIGURES 7 and 8, the top of bar 79–A is forced backward overcoming the force exerted by spring 79–C. This in turn lowers bracket 79–B until it contacts and actuates limit switch 77.

Referring now to FIGURES 10, 11 and 12, each of the pillars 39 comprises a stationary base member 41 secured to platform 31, a pivot shaft 43 supported by base member 41, a member 45 pivotable within base member 41 about shaft 43 between an outer position and an inner or upright position, power means 47 for moving member 43 between such positions, movable locking means 49 for cooperating with base member 41 to hold member 43 in upright position, and power means 51 operatively connected to locking means 49 for moving locking means 49 into and out of locking position. In FIGURE 10 the outer position assumed by member 45 is shown in broken outline. Movable member 45 includes side walls 45–A and 45–B and a front wall 45–C which faces the central portion of the holding device. The side walls 45–A and 45–B are spaced apart by brace 45–D.

Power means 47 for moving member 45 in this embodiment comprises a conventional hydraulic power system indicated by cylinder 47–A, operating arm or rod 47–B, and conduits 47–C. Cylinder 47–A is pivotably mounted on mounting bracket 41–C which in turn is mounted on stationary base member 41. Arm 47–B is operatively connected at one end to a piston, not shown, inside cylinder 47–A and to the movable member 45 at its other end. The conduits 47–C provide means for fluid communication between cylinder 47–A and exterior pumping means not shown. The power means 47 for each of the standards are operatively interconnected in a manner such that all such standards can be moved either toward or away from the workpiece at the same time. In another embodiment sequential clamping is assured through sequential movement of the standards.

Power means 51 for moving locking means 49 into and out of locking position in this embodiment comprises a conventional hydraulic power system similar to previously described power means 47. Power means 51 is indicated by cylinder 51–A and operating arm or rod 51–B. Cylinder 51–A is fixedly mounted on base member 41. Arm 51–B is operatively connected at one end to a piston, not shown, in cylinder 51–A and to locking means 49 at the other end. Although not shown in the drawings, it will be understood that cylinder 51–A is in fluid communication with exterior pumping means.

Fixedly mounted on the side walls 41–A and 41–B of the stationary base member 41 are locking pads 41–A–1 and 41–B–1. The side walls 45–A and 45–B of movable member 45 have fixedly mounted thereon locking pads 45–A–1 and 45–B–1 which move under pads 41–A–1 and 41–B–1 on base member 41 as movable member 45 moves into its upright position. Movable member 45 has a plurality of openings 45–A–2, 45–B–2 and 45–C–2 extending through the corresponding walls of movable member 45. These openings provide locating means for positioning clamping means in accordance with the configuration of the workpiece being processed. Smaller openings, not shown, are provided near each of these locating means for securing the clamping assemblies to member 45 with bolts or other suitable means.

Movable locking means 49 comprises a central member 49–A operatively connected to and supported by arm 51–B of power means 51, links 49–B and 49–C pivotably mounted on central member 49–A, and locking arms 49–D and 49–E which are fixedly connected to links 49–B and 49–C, respectively, and pivotably supported by mounting brackets 41–D and 41–E of base member 41 on pivot pins 41–D–1 and 41–E–1, respectively. Locking pads 49–D–1 and 49–E–1 are fixedly mounted on the locking arms 49–D and 49–E, respectively.

Mounted on side walls 41–A and 41–B of the stationary base 41 are limit switches 171 which are electrically connected in series by a conductor not shown. Limit switches 171 are tripped by actuating means 45–A–3 and 45–B–3 mounted on movable member 45. Such tripping occurs when member 45 reaches its upright position. The actuation of limit switches 171 actuates power means 51 which pulls central member 49–A downward thereby moving locking pads 49–D–1 and 49–E–1 of locking arms 49–D and 49–E upward against locking pads 45–A–1 and 45–B–1 of member 45 which in turn are pressed upward against locking pads 41–A–1 and 41–B–1 of stationary member 41.

The unlocking of the pillars 39 is actuated by the unlocking of clamping means hereinafter described. Upon such actuation rod 51–B moves central member 49–A upward, pads 49–D–1 and 49–E–1 are moved out of contact with pads 45–A–1 and 45–B–1, respectively, and the upper tip portion 49–A–1 of central member 49–A moves into contact with limit switch 173 supported by base member 41. The actuation of limit switch 173 actuates the reverse movement of power means 47 whereby member 45 is moved from the inner or upright position to the open or outer position. The completion of the downward movement of the pillars 39 actuates a pressure switch, not shown, which in turn actuates the upward movement of elevator 93.

In this embodiment the clamps 63 and the inner arms 59 of the clamping assemblies 55 are actuated and released by a conventional fluid pressure type power means 53 which may utilize compressed air. Power means of this type are well known in the art and may assume a variety of forms. The portion of the power means 53 which is positioned within movable member 45 is represented in FIGURE 12 by manifold cylinders 53–A and 53–B, which rest on cylinder support 45–E and are secured to movable member 45 by bracket assembly 53–C. Pumping means, not shown, are positioned outside this unit and operatively connected to one or more of the cylinders 53–A and 53–B.

In FIGURES 20 and 21 there is shown a preferred embodiment of locking means for locking the movable member 45 to stationary base member 41. In this embodiment a support bracket 201 is bolted or otherwise fixedly secured to mounting brackets 41–D and 41–E of stationary base 41. Support bracket 201 supports power means 203 and pins 205, the function of which will hereinafter become apparent. Power means 203 comprises a conventional hydraulic system indicated in the drawings by cylinder 207, operating arm or rod 209 and conduits 211. Power means 203 is operatively connected at its lower end to a movable locking means 213. Locking means 213 comprises cross members 213–A and 213–B which are fixedly secured to rod 209 by a pin 215 which extends through cross members 213–A and 213–B to provide means for actuating limit switch 173, and locking arms 213–C and 213–D which are pivotally connected to cross members 213–A and 213–B, respectively, and pivotably supported by the aforementioned pins 205 on support bracket 201. The locking arms 213–C and 213–D each carry a locking pad 213–C–1 and 213–D–1 fixedly secured thereto.

The power means 203 is actuated in the same sequence and in the same manner as in the previously described embodiment and the resulting downward motion of rod 209 causes pads 213–C–1 and 213–D–1 to be forced against the lower surfaces of pads 45–A–1 and 45–B–1 mounted on the movable member 45. This wedges the pads 45–A–1 and 45–B–1 against pads 41–A–1 and 41–B–1 mounted on the stationary base member 41 and thus locks the movable member 45 in upright position.

The reverse or upward movement of rod 209 pivots the pads 213–C–1 and 213–D–1 from beneath pads 45–A–1 and 45–B–1 freeing member 45 for movement to its outer position. The upward movement of rod 209 causes the projecting pin 215 to actuate limit switch 173, the function of which has been described with reference to FIGURES 10 and 11.

Referring now to FIGURES 14, 15, 16 and 17, attention is now directed to clamping assembly 55–A which is constructed and arranged for holding a workpiece, the configuration of which is such that one or more of the surfaces to be gripped cannot be effectively contacted for clamping when one or more of the work contacting surfaces of the clamping means are limited to a straight line or right angle approach to the workpiece. The work contacting elements of clamping assembly 55–A are simultaneously movable in two perpendicular planes, i.e., they undergo both forward and lateral movement in approaching the workpiece and lateral and backward movement when unclamping.

Clamping assembly 55–A mounted on one of the pillars 39 comprises an outer arm or bracket 57–A, an inner arm 59–A, motion transfer means or linkage 61–A and clamp 63–A.

Outer arm 57–A is fixedly mounted on stationary base member 41 of one of the pillars 39. Inner arm 59–A is supported intermediate the ends thereof by bifurcated support arm 45–F fixedly mounted on movable member 45 of the same pillar. Inner arm 59–A is pivotably connected to outer arm 57–A by pivot pin 57–A–1 and is pivotably mounted on support arm 45–F. This connection is established via ball pivot 59–A–1, pivot connecting bar or link 59–A–2, ball pivot 59–A–3 and mounting bracket 45–G. Support element 45–F has a locating pin 45–F–1 positioned inside one of the locating means 45–B–2 and defines a concave surface 45–F–2 upon which ball pivot 59–A–1 turns. Inner arm 59–A is operatively connected with ball pivot 59–A–3 and defines a surface 59–A–4 upon which such ball pivot turns. Support arm 45–F moves with movable member 45 carrying inner arm 59–A. Inner arm 59–A comes to rest on stop means 45–F–3 shown in FIGURE 16 when movable member 45 reaches its upright position.

Fixedly mounted on inner arm 59–A is the drive unit 53–D of power means 53 heretofore mentioned in relation to FIGURE 12. In the drawings drive unit 53–D is represented by cylinder 53–D–1, conduits 53–D–2, and piston rod 53–D–3. Piston rod 53–D–3 is operatively connected at one end to linkage 61–A and at the opposite end to a piston, not shown, within cylinder 53–D–1. Conduits 53–D–2 positioned at either end of cylinder 53–D–1 provide means for fluid communication between cylinders 53–D–1 and cylinders 53–A and 53–B shown in FIGURE 12.

Clamp 63–A is operatively connected to linkage 61–A and carries clamping pad 63–A–1 which contacts the workpiece when clamp 63–A is in clamping position. Linkage 61–A is a conventional, toggle type, motion transfer mechanism activated by the reciprocal rod 53–D–3. The movements of this linkage together with the more general movements of inner arm 59–A cause clamp 63–A to move laterally in relation to the portion of the workpiece to be gripped in addition to the forward or backward movement of the clamping or unclamping movements. This permits clamp 63–A to move around and behind the portion of the workpiece which it is intended to press against the locating pad 59–A–5, as illustrated in FIGURE 14. Locating pad 59–A–5, through the movements of inner arm 59–A, also undergoes a degree of lateral movement in addition to forward and backward movements in approaching and withdrawing from contact with the workpiece.

Referring now to FIGURES 18 and 19, attention is now directed to clamping assembly 55–B which is fixedly mounted on movable member 45 of one of the pillars 39. Clamping assembly 55–B comprises arm or bracket 57–B, motion transfer mechanism or linkage 61–B, locating pads 57–B–1 and 57–B–2, clamp 63–B and clamping pad 63–B–1. Arm 57–B is fixedly mounted on movable member 45. Fixedly mounted on arm 57–B is one of the drive units 53–D of power means 53. These units were described previously in relation to clamping assembly 55–A. Locating pads 57–B–1 and 57–B–2 are fixedly mounted on arm 57–B. Linkage 61–B is pivotably mounted on arm 57–B. Linkage 61–B is operatively connected at one end to the drive unit 53–D and to clamp 63–D at the opposite end. When movable member 45 of the pillar moves toward the upright position, locating pads 57–B–1 and 57–B–2 move toward the workpiece. When member 45 is upright such pads contact the workpiece and power means 53 actuates clamp 63–B via linkage 61–B. In clamped position the workpiece is thus held between clamping pad 63–B–1 and the locating pads 57–B–1 and 57–B–2.

In accordance with this invention the automotive body or other workpiece is tenuously assembled before entering the holding device 30. Ordinarily the component parts will be assembled and "tack" welded by placing spot welds at a number of strategically located holding spots. Any method may be used which will temporarily unite or hold together the various sheet metal parts in a manner such that the resulting assembly will stand without extraneous support.

In this embodiment the workpiece is carried to the holding device 30 by suitable conveyor means resting on the skid or pallet 83. The workpiece enters holding device 30 at the end opposite stop means 73–A and 73–B. When the initial workpiece enters the holding device 30, the stop means 73–A and 73–B are in their upright or stop positions, the pillars 39 are in their outer position, i.e., their pivotable portions leaning away from the center of holding device 30, the body locating and support means 71 are at rest in their down position and the lift or elevator 93 is in its up position. With succeeding workpieces entry may be made with the stop means 73–A and 73–B temporarily down, i.e., pivoted forward, to permit exit of the preceding workpiece. In this case return of the stop means to upright position occurs after the new workpiece enters holding device 30 and prior to the time it reaches the stop position against stop means 73–A and 73–B.

Pallet 83 rolls on and is guided by roll means 113 and 117 mounted on the lift assemblies 101 of lift or elevator 93. As the workpiece rolls forward over elevator 93, the pallet 83 depresses the actuating arm 159 of limit switch 157 on lift standard 105–C of elevator 93 shown in FIGURE 13 and the front portion of the workpiece contacts pivotable assembly 79 which actuates limit switch 77 on stop means 73–A. The actuation and function of limit switch 157 is described hereinafter in relation to the removal of the workpiece from the holding device. The actuation of limit switch 77 actuates the upward movement of body locating and support means 71 mounted on platform 31 from their down or rest position into their upright position. When this movement is completed, the support means 71 are then in position to receive the workpiece and the completion of this movement actuates a conventional pressure switch, not shown, which initiates the downward movement of elevator 93.

In the course of the downward movement of elevator 93, the workpiece is deposited upon the body locating and support means 71 with portions thereof telescoping over the conical positioning elements 71–B–8 and 71–C–8 on the body locating and support means 71–B and 71–C, respectively. The elevator 93 still supporting the pallet or skid 83 continues its downward movement until after pallet 83 is completely disengaged from the workpiece. As elevator 93 completes its downward movement, the bracket 125 on the movable members 109 of the lift standard 105–B contacts and actuates the limit switch 123 mounted on the corresponding base member 107. The actuation of limit switch 123 actuates the simultaneous movement of each of the pillars 39 from their outer position to their inner or upright positions via power means 47.

As the movable members 45 of pillars 39 reach their upright positions, they trip the corresponding limit switches 171 mounted on the corresponding base members 41 as described with reference to FIGURES 10 and 11. The tripping of the limit switches 171 actuates power means 51 which in turn actuates locking means 49 locking each of the movable members 45 in upright position. Completion of this locking step actuates a presure switch, not shown, which actuates the first of the clamping assemblies 55 causing the same to bring the corresponding clamp 63 into clamping position. This in turn actuates the power means 53 which causes this particular clamp 63 to close upon the workpiece. The various clamps are operatively interconnected and the closing of the first of the clamps 63 actuates a pressure switch or relay, not shown, which actuates the movement of other clamping assemblies and their corresponding clamps in a prederetermined step-wise order. In this manner the various parts of the workpiece are secured in position in a predetermined order thereby providing consistent sequential clamping in accordance with the physical characteristics of the workpiece assembly for which the clamping assemblies are at that moment arranged or designed to accommodate.

When the last of the clamps 63 are in clamping position upon the workpiece, a pressure switch, not shown, or other device equivalent for the purpose actuates the movement of automatic welders 67 into welding position.

In accordance with one embodiment, contact of the welding units 67 with the workpiece initiates the welding and actuates a conventional timing device, not shown. At the termination of a predetermined welding time, the timing device deactivates the welding units 67 and actuates their reverse movement away from the workpiece. At the termination of this reverse movement, the welding devices 67 contact one or more limit switches 69 which actuate the reopening of the clamps 61.

The reopening of the clamps 61 actuates pressure switches, not shown, which in turn actuate the unlocking of the movable members 45 of pillars 39 and the unlocking motion of locking means 49 trips limit switch 173 which actuates the reverse movement of power means 47 and the return of movable members 45 to their outer position to permit entry of another workpiece.

The completion of outward and downward movements of the movable members 45 of pillars 39 actuates a limit switch, not shown, which in turn actuates the upward movement of elevator 93.

In its upward movement elevator 93 still supporting the pallet 83 causes the pallet 83 to lift the workpiece from the body locating and support units 71 and returns the workpiece to exit level. At the completion of this upward movement, elevator 93 trips a limit switch 81 which actuates the pivoting of stop means 73–A and 73–B forward to permit the workpiece to be rolled forward on the rollers 113 and 117 of lift 93 until it moves out of the holding device 30.

When the pallet makes its exit from holding device 30, it continues to maintain actuating arm 159 depressed until it is free of the device. When this pressure is removed, arm 159 is forced from its depressed position by spring means, not shown, and thereby actuates limit switch 157. The actuation of limit switch 157 in turn actuates the return movement of stop means 73–A and 73–B to their upright position to receive another workpiece. It will be further understood that conventional switching and connecting devices, not shown, are employed between the various units hereinbefore described to implement and carry out the functions of such units as hereinbefore described. Such devices include, but not by way of limitation, conductors, insulators, pressure switches, electrical relays, power means, equipment protective devices, etc.

A major advantage afforded by the holding or framing device hereinbefore described is that the modifications required for periodic model changes incidental to automobile production and the like is reduced to a minimum. The major components of the device including the elevator means and the pivotable standards or pillars can be permanent fixtures. Conversion of the device for the processing of similar but somewhat different workpieces can be effected through relatively minor changes such as changes in the design and positioning of the clamping means mounted on such standards. This is made possible by the multiplicity of mounting means provided on the standards which permit attachment of clamping means and/or their supports in a wide variety of locations on such standards.

The foregoing detailed description of the embodiments shown in the drawings is submitted solely for purposes of illustration. Those skilled in the art will be aware that numerous modifications can be made in the aforedescribed methods and means without departing from the spirit of the invention as expressed in the claims.

I claim:

1. A device for holding an automobile body for welding comprising in combination a first holding unit positioned along one side of a holding zone, a second holding unit in substantially parallel relationship with said first holding unit and positioned on the opposite side of said holding zone, each of said holding units comprising a plurality of spaced apart pivotable standards with clamping means mounted thereon and extending therefrom toward the longitudinal axis of said holding device, each of said standards being pivotable between a clamping position wherein said clamping means are positioned to grip an automobile body within said holding zone and an open position wherein said clamping means are outside said holding zone, at least one of said clamping means being constructed and arranged to move in two mutually perpendicular planes simultaneously when its supporting standard is moved from said open position to said clamping position, operatively interconnected power means for moving said standards between said open position and said clamping position, locating means including elevator means constructed and arranged to receive and position an automobile body within said holding zone in three mutually perpendicular planes for seizure by clamping means of each of said holding units, and actuating means operatively interconnected for closing clamping means of each of said holding units upon an automobile body within said holding zone in predetermined sequence.

2. A device for holding an automobile body for welding comprising in combination a first holding unit positioned along one side of a holding zone, a second holding unit in substantially parallel relationship with said first holding unit and positioned on the opposite side of said holding zone, each of said holding units comprising a plurality of spaced apart pivotable standards with clamping means mounted thereon and extending therefrom toward the longitudinal axis of said holding device, each of said standards being pivotable between a clamping position wherein said clamping means are positioned to grip an automobile body within said holding zone and an open position wherein said clamping means are outside said holding zone, operatively interconnected power means for moving said standards between said open position and said clamping position, locating means including elevator means constructed and arranged to receive and position an automobile body within said holding zone in three mutually perpendicular planes for simultaneous seizure by clamping means of each of said holding units, and operatively interconnected clamp closing means for closing said clamping means upon an automobile body within said holding zone in predetermined sequence, said clamp closing means being actuated by the movement of said clamping means into said clamping position.

3. A device for holding an automobile body for welding comprising in combination a first holding unit positioned along one side of a holding zone, a second holding unit in substantially parallel relationship with said first holding unit and positioned on the opposite side of said holding zone, each of said holding units comprising a plurality of spaced apart pivotable standards and a plurality of clamping means detachably mounted upon said standards and extending therefrom toward the longitudinal axis of said holding device, each of said standards including a plurality of mounting means admitting of the mounting of clamping means at a plurality of locations thereon, said standards being pivotable between a clamping position wherein the clamping means mounted thereon are positioned to grip an automobile body within said holding zone and an open position wherein the clamping means mounted thereon are outside said holding zone, locating means including elevator means constructed and arranged to receive and position an automobile body within said holding zone in a predetermined position, and operatively interconnected clamp closing means adapted to close said clamping means upon an automobile body within said holding zone in predetermined sequence, said clamp closing means being actuated by the movement of said body into said predetermined position.

4. A device for holding a tenuously assembled automobile body for the welding together of the parts thereof which comprises in combination a first holding unit positioned along one side of a holding zone, a second holding unit in substantially parallel relationship with said first holding unit and positioned on the opposite side of said holding zone from said first holding unit, each of said holding units comprising a plurality of spaced apart pivotable standards, said standards supporting a plurality of clamping means which extend therefrom in a direction toward the standards on the opposite side of said holding zone, each of said standards being pivotable between a clamping position wherein said clamping means are positioned to grip an automobile body within said holding zone and an open position wherein said clamping means are outside said holding zone, a plurality of standards in said first unit being paired with a corresponding number of standards in said second unit in a manner whereby clamping means supported by each standard of each such pair are aligned with the corresponding clamping means of the paired standard to admit of cooperative engagement of an automobile body within said holding zone along a common line perpendicular to the longitudinal axis of said body when said axis is aligned in parallel relationship with the longituidnal axis of said holding zone, locating means constructed and arranged to receive and locate an automobile body within said holding zone in a predetermined position with respect to three predetermined and mutually perpendicular planes while said standards are withdrawn from said clamping position, said body when in said predetermined position being positioned to receive and to be gripped by said clamping means when said standards are in said clamping position, fluid pressure actuated transfer means constructed and arranged to pivot said standards between said clamping position and said open position, and clamp actuating means for opening and closing said clamping means when said standards are in said clamping position.

5. In combination welding means and a holding device, said holding device comprising in combination a plurality of clamping means, a plurality of pivotable standards supporting said clamping means, said standards being spaced apart along opposite sides of a holding zone and constructed and arranged to move said clamping means between a first position outside said holding zone and a second position at least partially within said holding zone when said standards are moved about their respective pivots, operatively interconnected power means for moving said standards about their respective pivots, locating means within said holding zone adapted to receive and triplanar position a workpiece within said holding zone to be gripped by said clamping means, and operatively interconnected actuating means for closing said clamping means upon said workpiece in predetermined sequence, said welding means being pivotable between a first position in contact with a workpiece held by said clamping means and a second position out of contact with a workpiece held by said clamping means, the pivoting of said welding means into said first position being actuated by the closing of said clamping means, and the pivoting of said welding means into said second position being actuated after a predetermined period of contact between said welding device and said workpiece by a timing device actuated by the initiation of said contact.

6. In combination welding means and a holding device, said holding device comprising in combination a plurality of clamping means, a plurality of pivotable standards supporting said clamping means, said standards being spaced apart along opposite sides of a holding zone and constructed and arranged to move said clamping means between a first position outside said holding zone and a second position at least partially within said holding zone when said standards are moved about their respective pivots, locating means within said holding zone adapted to receive and triplanar position a workpiece within said holding zone to be gripped by said clamping means, and operatively interconnected actuating means for closing said clamping means upon said workpiece in predetermined sequence, said welding means being pivotable between a first position in contact with a workpiece held by said clamping means and a second position out of contact with a workpiece held by said clamping means, the movement of said welding means into contact with said workpiece being actuated by the closing of said clamping means and the movement of said welding means out of contact with said workpiece actuating the opening of said clamping means.

7. A device for holding the component parts of a tenuously assembled automobile body in fixed relationship with respect to each other for the welding together of the parts thus held, said device comprising in combination a first holding unit, a second holding unit, a base support member, welding means, and locating means for positioning an automobile body in a predetermined position above said base support member; said first holding unit and said second holding unit disposed along opposite sides of a holding zone above said base support member; each of said holding units comprising a plurality of clamping means and a plurality of pivotable standards supporting said clamping means; each of said standards being pivotable in a plane substantially perpendicular to the longitudinal axis of said holding device between an inner position wherein the clamping means supported thereby extend into said holding zone and an outer position wherein the clamping means supported thereby are withdrawn from said holding zone; each of said standards including a plurality of mounting means constructed and arranged to admit of the positioning and support of clamping means in a plurality of locations upon the standard; said clamping means including operatively interconnected clamp actuating means for closing said clamping means upon an automobile body within said holding zone in an essentially continuous predetermined stepwise sequence and to release said clamping means to permit removal of said automobile body from said holding zone; said locating means including elevator means, roll means mounted on said elevator means, and movable stop means mounted on said base support member; said roll means being constructed and arranged to position in a first plane an automobile body being passed through said holding zone and supported by said elevator means; said stop means being constructed and arranged to arrest the movement of an automobile body passing into said holding zone, to position said body in a second plane perpendicular to said first plane, to actuate said elevator means when contacted by an automobile body entering said holding zone and to admit of continued forward movement of the arrested body to permit the exit thereof from said holding device upon release of said clamping means; said elevator means being constructed and arranged to position an automobile body within said holding zone in a third plane perpendicular to both said first plane and said second plane; said base support member supporting a plurality of pivotable support means for providing vertical support for an automobile body held by said clamping means; at least one of said pivotable support means supporting a substantially conical positioning element, and said welding means being constructed and arranged to move into operative connection with an automobile body when said body is moved into said predetermined position by said locating means and to move out of operative connection with said automobile body after a predetermined period of contact to permit removal of said body from said holding device.

8. A device for positioning an object and holding said object in the resultant position comprising in combination
(a) a plurality of movable clamp supporting means,
(b) clamping means movable with and supported by said movable clamp supporting means,
said movable clamp supporting means being movable between a first position wherein said clamping means are in clamping position and a plurality thereof substantially define a perimeter of a holding zone and a second position wherein said clamping means are in a rest position outside said holding zone which admits of entry of said object into said holding zone and exit of the same therefrom,
(c) locating means constructed and arranged to receive and locate said object within said holding zone in a predetermined position with respect to three predetermined and mutually perpendicular planes while said clamping means are withdrawn from said clamping position,
said object when in said predetermined position being positioned to receive and to be gripped by said clamping means when said movable clamp supporting means are moved into said first position,
(d) transfer means constructed and arranged to move said movable clamp supporting means between said first position and said second position, and
(e) clamp actuating means for opening and closing said clamping means when said clamping means are in said clamping position.

9. A device in accordance with claim 8 wherein said clamping means are operatively interconnected and constructed and arranged to be closed upon said object in predetermined sequence.

10. A device in accordance with claim 8 wherein said clamping means are operatively interconnected, said actuation means are constructed and arranged to initiate closing of said clamping means in unison, said clamping means comprising a first group of clamping means and a second group of clamping means which differ in construction with respect to said first group, and said second group of clamping means are constructed and arranged in a manner such that the clamps thereof close after the clamps of said first group of clamping means are closed.

11. A device in accordance with claim 8 wherein said clamping means include at least one clamp constructed and arranged to move in two mutually perpendicular planes in moving between said rest position and said clamping position.

12. A device in accordance with claim 8 wherein said clamping means include at least one clamp constructed and arranged to move in two mutually perpendicular planes simultaneously when said clamp supporting means are moved between said second position and said first position.

13. A device in accordance with claim 8 wherein said clamp supporting means are movably mounted upon pivotable standards spaced apart, fixedly supported, and arranged in substantially parallel lines disposed along opposite sides of and substantially parallel to the longitudinal axis of said holding zone.

14. A device for positioning an irregularly shaped object and holding said object in the resultant position comprising in combination
(a) a first holding unit positioned on one side of a holding zone,
(b) a second holding unit in substantially parallel relationship with said first holding unit and positioned on the opposite side of said holding zone,
each of said holding units comprising
(1) a plurality of spaced apart pivotable standards including a plurality of mounting means admitting of the mounting of clamping means at a plurality of locations thereon,
(2) clamping means detachably mounted on said standards and extending therefrom toward the longitudinal axis of said holding zone,
each of said standards being pivotable between a first position wherein said clamping means are in clamping position and substantially define the horizontal perimeter of said holding zone and a second position wherein said clamping means are withdrawn from said clamping position to a rest position spaced apart from said longitudinal axis a greater distance than said clamping position, (c) locating means constructed and arranged to receive and locate said object within said holding zone in a predetermined position with respect to three predetermined and mutually perpendicular planes while said clamping means are withdrawn from said clamping position, said object when in said predetermined position being positioned to receive and to be gripped by said clamping means when said standards are pivoted into said first position, (d) transfer means for pivoting said standards between said first position and said second position, and (e) clamp actuating means for opening and closing said clamping means when said clamping means are in said clamping position.

15. A device in accordance with claim 14 wherein said pivotable standards of said first holding unit are operatively interconnected and operatively connected with power means constructed and arranged to pivot said standards in unison between said first position and said second position.

16. A device in accordance with claim 14 wherein said pivotable standards include locking means which lock said standards in position upon said standards being moved into said first position.

17. A device in accordance with claim 14 wherein said pivotable standards are pivotable between said first position and said second position in predetermined sequence.

18. A device in accordance with claim 14 wherein a plurality of standards in said first group are positioned in directly opposed relationship across said holding zone with respect to a corresponding number of standards in said second group.

19. A device in accordance with claim 14 wherein said standards are pivotable between said first position and said second position in predetermined sequence and said clamp actuating means are constructed and arranged to close said clamping means in accordance with the sequence of the standards upon which said clamping means are mounted.

20. A device in accordance with claim 14 wherein said clamping means are operatively connected with power means for closing said clamping means and operatively interconnected in a manner such that activation of said power means effects closing of said clamping means in predetermined sequence.

21. A device for positioning a tenuously assembled, irregularly shaped object, holding said object in the resultant position, and holding component parts of said object in fixed relationship with respect to each other for the welding together thereof, said device comprising in combination (a) a plurality of movable clamp supporting means, (b) clamping means mounted on said movable clamp supporting means, said movable clamp supporting means being movable between a first position wherein said clamping means are in clamping position and substantially define the horizontal perimeter of a substantially rectangular holding zone and a second position wherein said clamping means are in a position of rest outside said holding zone which admits of entry of said object into said holding zone and exit of the same therefrom, (c) locating means including guide means, stop means, and vertically reciprocal lift means, constructed and arranged to receive and locate said object within said holding zone in a predetermined position with respect to three predetermined and mutually perpendicular planes while said clamping means are withdrawn from said clamping position, said object when in said predetermined position being positioned to receive and to be gripped by said clamping means when said movable clamp supporting means are moved into said first position, (d) transfer means constructed and arranged to move said movable clamp supporting means between said first position and said second position, and (e) clamp actuating means operatively connected with said clamping means for opening and closing said clamping means when said clamping means are in said clamping position.

22. A device in accordance with claim 21 wherein said locating means comprise guide means constructed and arranged to position said object in a first plane, stop means constructed and arranged to position said object in a second plane that is perpendicular to said first plane while said object is positioned in said first plane, and lift means constructed and arranged to position said object in a third plane that is perpendicular to said first plane and said second plane while said object is positioned in said first plane and said second plane.

23. A device in accordance with claim 21 wherein said guide means comprise first roll means that rotate in a first plane and second roll means that rotate in a second plane, said second plane being perpendicular to said first plane.

24. A device in accordance with claim 21 wherein at least one clamp of said clamping means is constructed and arranged to clamp together tenuously assembled components of said object at a first location on a first side of said object and a second clamp of said clamping means is constructed and arranged to clamp together assembled components of said object at a second location on a second side of said object, said second side being the side opposite said first side, said second location being directly opposite and across said holding zone from said first location.

25. A device in accordance with claim 21 wherein at least one clamp of said clamping means is constructed and arranged to clamp together tenuously assembled components of said object at a first location on a first side of said object and a second clamp of said clamping means is constructed and arranged to clamp together tenuously assembled components of said object at a second location on a second side of said object, said second side being the side opposite said first side, said second location being across said holding zone from said first location and laterally disposed in relation to said first position along a line parallel to the longitudinal axis of said holding zone.

26. A device in accordance with claim 21 wherein said guide means are mounted on and supported by said lift means.

27. A device in accordance with claim 21 wherein said guide means comprise first roll means rotatably mounted on said lift means and constructed and arranged to rotate in a horizonal plane and second roll means rotatably mounted on said lift means, laterally disposed in relation to said first roll means, and constructed and arranged to rotate in a vertical plane.

28. A device for positioning an irregularly shaped object comprising tenuously assembled components of an automobile body, holding said object in the resultant position, and holding component parts of said object in fixed relationship with respect to each other for the welding together thereof, said device comprising in combination (a) a plurality of movable clamp supporting means, (b) clamping means detachably mounted on said movable clamp supporting means,
    said movable clamp supporting means being movable between a first position wherein said clamping means are in clamping position and substantially define the horizontal perimeter of a holding zone and a second position wherein said clamping means are in a position of rest outside said holding zone which admits of entry of said object into said holding zone and exit of the same therefrom,
(c) locating means including guide means, stop means, and vertically reciprocal lift means, constructed and arranged to receive and locate said object within said holding zone in a predetermined position with respect to three predetermined and mutually perpendicular planes while said clamping means are withdrawn from said clamping position,
    said object when in said predetermined position being positioned to receive and to be gripped by said clamping means when said movable clamp supporting means are moved into said first position,
(d) operatively interconnected transfer means constructed and arranged to move said movable clamp supporting means between said first position and said second position, and
(e) clamp actuating means operatively connected with said clamping means for opening and closing said clamping means when said movable clamp supporting means are in said first position.

29. A device in accordance with claim 28 wherein said stop means and said lift means are operatively interconnected in a manner such that contact with said stop means by said object moving along and in guide relationship with said guide means actuates downward movement of said lift means.

30. A device in accordance with claim 28 wherein said locating means also includes vertical support means intermediate between the upper and lower terminal positions of said reciprocal lift means, said vertical support means being constructed and arranged to receive said object from said lift means as it descends from said upper terminal position and to vertically support said object while said object is gripped by said clamping means.

31. A device in accordance with claim 28 wherein said locating means also includes vertical support means intermediate between the upper and lower terminal positions of said reciprocal lift means, said vertical support means being constructed and arranged to receive said object from said lift means and to vertically support said object while said lift means continues its descent to said lower terminal position.

32. A device in accordance with claim 28 wherein said lift means and said clamping means are operatively connected and downward movement of said lift means actuates movement of said clamping means into said clamping position.

33. A device in accordance with claim 28 wherein power means are operatively connected with said clamping means for opening and closing said clamping means and movement of said clamping means into said clamping position actuates said power means and closes said clamping means.

34. A device in accordance with claim 28 including welding means positioned outside said holding zones, movable between a welding position and a rest position, and operatively connected with said clamping means wherein closing of said clamping means upon said object actuates movement of said welding means into said welding position and against said object.

35. A device in accordance with claim 28 including welding means positioned outside said holding zone, movable between a welding position and a rest position, and operatively connected with said clamping means wherein movement of said welding means away from said welding position actuates opening of said clamping means, and movement of said clamping means out of said clamping position.

36. A device in accordance with claim 28 wherein said clamp supporting means and said lift means are operatively connected and movement of said clamp supporting means to said second position actuates upward movement of said lift means.

37. A device in accordance with claim 28 wherein said stop means are movable between an activated position wherein said stop means serve to arrest movement of said object when said object is moved in the direction of said stop means, along and in guide relationship with said guide means, and into contact with said stop means and a deactivated position which admits of continued movement of said object in said direction in guide relationship with said guide means until said object exits from said holding zone.

38. A device in accordance with claim 37 wherein said stop means and said lift means are operatively connected and upward movement of said lift means actuates movement of said stop means from said activated position to said deactivated position.

39. A device in accordance with claim 37 wherein said object passes over said stop means in exiting from said holding zone and said stop means are operatively connected with spring means that move said stop means into said activated position when said object has exited thereover.

40. A device for positioning a partially assembled, shell-like structure which comprises a plurality of sheet metal components and structural support components of metal tenuously held in assembled relationship and substantially defining an interior compartment which is in communication with the exterior of said structure through a plurality of openings which are at least partially framed by a portion of said structural support components, holding said structure in the resultant position, and holding said components in fixed relationship with each other for the welding together thereof, said device comprising in combination (a) a plurality of movable clamp supporting means,
(b) clamping means detachably mounted on said movable clamp supporting means,
    said movable clamp supporting means being movable between a first position wherein said clamping means are in a clamping position and a plurality thereof substantially define the horizonal perimeter of a holding zone and a second position wherein said clamping means are in a position of rest outside said holding zone which admits of entry of said object into said holding zone and exit of the same therefrom,
(c) locating means constructed and arranged to receive and locate said structure within said holding zone in a predetermined position with respect to three predetermined and mutually perpendicular planes while said clamping means are withdrawn from said clamping position,
    said structure when in said predetermined position being positioned to receive and to be gripped by said clamping means when said movable clamp supporting means are moved into said first position, each of said clamping means comprising at least one power actuated clamp, each of said clamps including a first member constructed and arranged to contact the portion of said structure to be gripped by said clamp and a second and mating member constructed and arranged to contact the opposite side of said portion and exert pressure in the direction of said first member,
(d) power means constructed and arranged to move said movable clamp supporting means between said first position and said second position, and (e) power means for opening and closing said clamps when said clamping means are in said clamping position.

41. A device in accordance with claim 40 wherein one of said members of at least one of said clamps is constructed and arranged to enter into said interior compartment through one of said openings when said clamp supporting means are moved from said second position into said first position.

42. A device in accordance with claim 40 wherein at least a portion of one of said members of at least one of said clamps is constructed and arranged to enter into said interior compartment through one of said openings when said clamp supporting means are moved from said second position into said first position and, upon actuation of said clamping means, to exert pressure against an internal portion of said structure directed outwardly in relation to said internal compartment.

43. A device in accordance with claim 40 wherein at least a portion of one of said members of at least one of said clamps is constructed and arranged to enter into said interior compartment through one of said openings when said clamp supporting means are moved from said second position into said first position and, upon actuation of said clamping means, to exert pressure against an internal portion of said structure directed away from the longitudinal axis of said holding zone.

44. A device in accordance with claim 40 wherein one of said members of at least one of said clamps on a first side of said longitudinal axis of said holding zone and one of said members of at least one of said clamps on the opposite side of said longitudinal axis of said holding zone are constructed and arranged to enter into said interior compartment through said openings, contact an internal surface of said structure on their respective sides of said longitudinal axis, and, upon actuation of said clamping means, exert pressure against the respective internal surfaces directed away from said longitudinal axis.

45. A device in accordance with claim 40 wherein at least one of said members of at least one of said clamps is constructed and arranged to contact at least two substantially perpendicular surfaces of a predetermined portion of said structure, and, upon actuation of said clamping means, to exert pressure against said surfaces while the mating member of said clamp exerts pressure on the opposite side of said portion directed toward at least one of said surfaces.

46. A device for positioning a partially assembled shell-like structure which comprises a plurality of sheet metal components and structural support components of metal tenuously held in assembled relationship and substantially defining an interior compartment, at least one of said components providing an under surface for said structure and having at least one aperture therein, holding said structure in the resultant position, and holding said components in fixed relationship with each other for the welding together thereof, said device comprising in combination (a) a plurality of movable clamp supporting means,
(b) clamping means detachably mounted on said movable clamp supporting means,
said movable clamp supporting means being
(1) spaced apart and situated on opposite sides of the longitudinal axis of a holding zone and
(2) movable between a first position wherein said clamping means are in clamping position and a plurality thereof substantially define the horizontal perimeter of said holding zone and a second position wherein said clamping means are in a position of rest outside said holding zone which admits of entry of said structure into said holding zone and exit of the same therefrom, (c) locating means constructed and arranged to receive and locate said structure within said holding zone in a predetermined position with respect to three predetermined and mutually perpendicular planes while said clamping means are withdrawn from said clamping position, said structure when in said predetermined position being positioned to receive and to be gripped by said clamping means when said movable clamp supporting means are moved into said first position, said locating means comprising lift means reciprocal between an upper terminal position and a lower terminal position and vertical support means comprising a plurality of spaced apart vertical support members constructed and arranged to receive said structure from said lift means as said lift means descends from said upper terminal position toward said lower terminal position and to vertically support said structure, at least one of said vertical support members comprising a positioning element constructed and arranged to enter into an aperture in said under surface as said structure is lowered to said vertical support members by said lift means, (d) transfer means constructed and arranged to move said movable clamp supporting means between said first position and said second position, and
(e) clamp actuating means for opening and closing said clamping means when said clamping means are in said clamping position.

47. A device in accordance with claim 46 wherein said positioning element is constructed and arranged to substantially close said aperture when said structure comes to rest upon said vertical support means.

48. A device in accordance with claim 46 wherein said positioning element is substantially conical.

49. A device in accordance with claim 46 wherein at least two of said supporting members comprise positioning elements constructed and arranged to enter into apertures in an under surface of said structure when said structure comes to rest upon said vertical support means.

50. A device in accordance with claim 46 wherein the load receiving surfaces of said vertical support members are pivotable between an upright support position and a lower position of rest.

51. The method of assembling an automobile body which comprises tenuously assembling component parts thereof into a partially assembled and self-supporting structure, moving said structure into a holding zone between at least two opposing groups of operatively interconnected clamping means which are movable in unison in relation to said holding zone and close in predetermined positions when actuated, moving said structure into a predetermined position within said holding zone with respect to three predetermined and mutually perpendicular planes while said clamping means are outside said holding zone, said structure when in said predetermined position being positioned to receive and to be gripped by said clamping means when said clamping means are moved to said holding zone, effecting final adjustment of said component parts in relation to each other for the welding together thereof by moving said clamping means to said holding zone, actuating said clamping means, closing said clamping means upon said structure, and clamping together component parts of said structure along at least two opposing sides of said structure, and welding together said component parts while said structure is held in said predetermined position and said component parts are held in said final adjustment.

52. The method of assembling an automobile body which comprises tenuously assembling component parts thereof into a partially assembled and self-supporting structure, moving said structure into a holding zone between at least two opposing groups of operatively interconnected clamping means which are movable in relation to said holding zone and close sequentially in predetermined positions when actuated, moving said structure into a predetermined position within said holding zone with respect to three predetermined and mutually perpendicular planes while said clamping means are outside said holding zone, said structure when in said predetermined position being positioned to receive and to be gripped by said clamping means when said clamping means are moved to said holding zone, effecting final adjustment of said component parts in relation to each other for the welding together thereof by moving said clamping means to said holding zone, actuating said clamping means, sequentially closing said clamping means upon said structure, and clamping together component parts of said structure along at least two opposing sides of said structure, and welding together said component parts while said structure is held in said predetermined position and said component parts are held in said final adjustment.

References Cited by the Examiner
UNITED STATES PATENTS

| | | | |
|---|---|---|---|
| 1,190,902 | 7/1916 | Hood | 219—64 |
| 1,534,422 | 4/1925 | Smith et al. | 219—161 X |
| 2,294,418 | 9/1942 | Murch | 219—64 |
| 2,623,973 | 12/1952 | Malke | 219—161 X |

RICHARD M. WOOD, *Primary Examiner.*

B. STEIN, *Assistant Examiner.*